United States Patent [19]

Swanstrom

[11] Patent Number: 5,754,884
[45] Date of Patent: May 19, 1998

[54] METHOD FOR IMPROVING THE REAL-TIME FUNCTIONALITY OF A PERSONAL COMPUTER WHICH EMPLOYS AN INTERRUPT SERVICING DMA CONTROLLER

[75] Inventor: Scott Swanstrom, Austin, Tex.

[73] Assignee: Advanced Micro Devices, Sunnyvale, Calif.

[21] Appl. No.: 650,524

[22] Filed: May 20, 1996

[51] Int. Cl.$^6$ ............................. G06F 13/00; G06F 13/38
[52] U.S. Cl. ........................ 395/842; 395/500; 395/735
[58] Field of Search ............................. 395/825, 842, 395/843, 869, 733, 735, 739, 500

[56] References Cited

U.S. PATENT DOCUMENTS

| | | | |
|---|---|---|---|
| 4,797,853 | 1/1989 | Savage et al. | 395/842 |
| 4,989,113 | 1/1991 | Hull, Jr. et al. | 395/842 |
| 5,325,489 | 6/1994 | Mitsuhira et al. | 395/842 |
| 5,450,551 | 9/1995 | Amini et al. | 395/299 |
| 5,630,171 | 5/1997 | Chejlava, Jr. et al. | 395/843 |

*Primary Examiner*—Dinh C. Dung
*Attorney, Agent, or Firm*—Conley, Rose & Tayon; B. Noel Kivlin

[57] ABSTRACT

A method for performing data transfers in a computer system comprising an improved DMA controller (DMAC) for performing DMA transfers between a peripheral device and system memory and receiving and servicing interrupts generated by the peripheral device. The system comprises a CPU, system memory, the DMA controller and a plurality of peripheral devices interconnected by buses. The CPU programs the peripheral, such as a disk drive, to retrieve or store data. When the peripheral has retrieved the data or is ready to receive the data the peripheral generates an interrupt. The CPU programs the DMAC to perform DMA transfers between the peripheral and the system memory and to selectively decouple the interrupt request from the peripheral to the CPU so that the DMAC can service the interrupt from the peripheral rather than the CPU. The decoupling is selectively performed so that, in the case of a write to the peripheral, the DMAC can receive the interrupt from the peripheral and perform the data transfer. In the case of a read from the peripheral, the DMAC performs the data transfer, then receives and services the interrupt from the peripheral. The CPU also programs the DMAC to selectively generate an interrupt to the CPU upon completion of DMA transfers. The CPU also programs the DMAC to selectively wait for an interrupt from the peripheral before performing the DMA transfers. The CPU also programs the DMAC to selectively poll for status in the peripheral and check for error conditions.

5 Claims, 17 Drawing Sheets

| | | | |
|---|---|---|---|
| 824 | | IRQ Transfer Level Register | 800 |
| 822 | | Start On Interrupt Register | |
| 826 | | Peripheral Interrupt Clear Address Register | |
| 828 | | Peripheral Interrupt Clear Value Register | |
| 830 | | Peripheral Interrupt Clear Operation Register | |
| 842 | | Interrupt On Transfer Complete Register | |
| 844 | | Interrupt Request Clear Register | |
| 804 | | Source Address Register | |
| 806 | | Destination Address Register | |
| 802 | | Byte Count Register | |
| 812 | | Status Register | |
| 808 | | Increment Source Address Register | |
| 810 | | Increment Destination Address Register | |
| 854 | | Valid Start Condition Address Register | |
| 856 | | Valid Start Condition Value Register | |
| 858 | | Valid Start Condition Mask Register | |
| 852 | | Transfer Only On Valid Start Condition Register | |
| 862 | | Valid Start Condition Period Register | |
| 870 | | Cycle-Type Register | |
| 882 | | Scatter/Gather Register | |
| 892 | | Error Condition Address Register | |
| 893 | | Error Condition Value Register | |
| 894 | | Error Condition Mask Register | |
| 895 | | Check for Error Condition Register | |
| 896 | | Interrupt on Error Condition | |

FIG. 8

METHOD FOR IMPROVING THE REAL-TIME FUNCTIONALITY OF A PERSONAL COMPUTER WHICH EMPLOYS AN INTERRUPT SERVICING DMA CONTROLLER

BACKGROUND OF THE INVENTION

1. Field of the Invention

This invention is related to the field of personal computer systems which execute real-time and/or multimedia applications and more particularly to a Direct Memory Access (DMA) controller and the method of employing the DMA controller to improve the real-time functionality of such systems by performing data transfers for the system processor in response to peripheral device interrupts.

2. Description of the Relevant Art

A typical computer system contains peripheral devices such as hard disk drives, floppy disk drives, CD-ROM drives, video adapters, audio cards, and other similar devices which are typically connected to one or more expansion buses. Data transfers must be performed between a source and a destination, e.g., between a peripheral device and system memory. These data transfers are most often performed in response to commands from a central processing unit (CPU).

Some peripheral devices have the capability to become masters of the expansion bus and perform transfers of data without CPU involvement. However, some peripheral devices do not possess such bus mastering capability and require the CPU to transfer the data from the source to the destination. In some system architectures, particularly personal computers which employ Intel® microprocessors, this type of operation is commonly referred to as a Programmed I/O (PIO) operation. In PIO operations, a program executing on the CPU, usually a device driver, performs I/O read or write cycles to the peripheral to load or store a word of data at a time from or to the peripheral. A common example of PIO operation is with hard disk drives which employ the AT interface, also known as Integrated Drive Electronics (IDE) disk drives. A detailed description of the operation of the AT interface is described within the publication "AT Interface Manual"; (Seagate Technology, Inc. 1989; publication number 36111-001, Rev. A).

Peripheral devices also commonly need to alert the CPU or request service under certain conditions, this being referred to as an interrupt request or interrupt. Common reasons for a peripheral to interrupt a CPU are to notify the CPU of the availability of data, the completion of an operation such as storing data, a need to transfer data, or the occurrence of an error condition. An interrupt request is usually a hardware signal sent from the peripheral through an interrupt controller to the CPU to notify the CPU that the peripheral requires service. Upon reception of the interrupt request, a CPU will typically acknowledge the interrupt request and invoke a software program, referred to as an interrupt service routine, associated with the interrupt source, to service the interrupt. Each interrupt source in a system commonly has an associated priority. If an interrupt occurs at a given priority, interrupts of lower priority will not be serviced until the higher priority interrupt has been serviced.

Interrupt service routines are normally the part of a device driver which performs the PIO discussed previously. This PIO takes place at the priority associated with the interrupt source. One consequence is that valuable CPU bandwidth is consumed with the task of performing the PIO at the expense of tasks which it might otherwise perform. This is in contrast to bus mastering devices which do not require CPU involvement. A second consequence is that other interrupt sources which are lower priority than the priority associated with the PIO peripheral device will not receive service until the PIO is complete. Often peripheral devices such as hard drives and CD-ROM drives have a relatively high associated interrupt priority. These consequences are at enmity with the principles of real-time isochronous systems, which require the characteristic of guaranteed responsiveness to real-time events, such as interrupts.

One of the most common, and perhaps most important, applications of real-time systems is that of personal computers which generate audio and video, commonly referred to as multimedia computers. To generate audio or video, PC's require large amounts of highly sequential audio or video data to be transferred from a peripheral device such as a hard drive or CD-ROM, to an audio device or video display device. Not only do multimedia applications require the transfer of large amounts of data, but also they require the data to be supplied at certain guaranteed rates, below which the fidelity of the sound or graphic image is compromised. In the case of a PIO peripheral, as more data is transferred more CPU bandwidth is consumed, commonly at a high interrupt priority, thus making the system less responsive to the real-time events associated with multimedia devices.

Another pertinent aspect associated with interrupts is that CPU bandwidth is consumed when the CPU executes interrupt service routines. This is because a non-trivial number of instructions are executed by interrupt service routines, regardless of whether or not they perform PIO. For example, an interrupt may require the CPU to program a task switch, including saving values such as the correct stack pointer and instruction pointer on a stack and perhaps performing a ring transition to change privilege levels. This potentially adds a large amount of CPU overhead to each interrupt. Other common functions of interrupt service routines are determining the source and cause of the interrupt and clearing the source of the interrupt. Additionally, interrupt service routines check the status of the interrupting device such as for completion of operations or data transfers. Interrupt service routines also send control information to the interrupting device such as sending a command or requesting a data transfer or acknowledging a status or event. Hence, a desire to reduce the number of interrupts generated to the CPU associated with data transfers is realized.

A third method for performing data transfers in addition to bus mastering and PIO is what is commonly known as direct memory access (DMA) transfers, or sometimes referred to as third-party DMA transfers. Bus master data transfers are sometimes referred to as first-party DMA transfers. Henceforth the term "DMA transfer" is used to denote third-party DMA transfers as opposed to bus master data transfers. DMA transfers are commonly performed by a DMA controller device. A DMA controller performs data transfers by reading data from a source device and writing the data to a destination device. This operation relieves the CPU of performing the data transfer. Instead, the CPU programs the DMA controller with information about the transfer such as a source address, destination address and amount of data to be transferred. A common example of a peripheral device in a personal computer for which a DMA controller performs DMA transfers is the floppy disk drive.

DMA controllers also generate interrupt requests to the CPU to notify the CPU of events, most often the completion of a DMA transfer. In the prior art the DMA controller interrupt is distinct from the interrupts generated by the peripheral devices. Consequently, a separate interrupt service routine is associated with the DMA controller interrupt. The DMA controller's interrupt service routine notifies the peripheral device's device driver that the DMA transfer has completed.

Referring to FIG. 1, a computer system 100 according to the prior art is shown. The computer system 100 includes a CPU 110 coupled through a host bus 180 to chipset logic 170. A system memory 120 is coupled through a memory bus 190 to chipset logic 170. The CPU 110 and system memory 120 are coupled through chipset logic 170 to an expansion bus 130. Expansion bus 130 typically conforms to a popular bus standard such as the Industry Standard Architecture (ISA), Extended Industry Standard Architecture (EISA), Microchannel Architecture (MCA), or Peripheral Component Interconnect (PCI).

A secondary expansion bus bridge 192 couples expansion bus 130 to a secondary expansion bus 194. Secondary expansion bus 194 is an ISA bus, and secondary expansion bus bridge 192 is an ISA bus bridge.

A plurality of peripheral devices 140A–140N (referred to collectively as peripheral devices 140) are coupled to expansion bus 130 and/or secondary expansion bus 194 and are typically devices such as hard disk drives, CD-ROM drives, floppy disk drives, video adapters, DMA controllers, serial ports, parallel ports or other devices as are well known in the art. Peripheral devices 140A–140N (referred to collectively as peripheral devices 140) include peripheral interrupt request outputs 142A–142N (referred to collectively as peripheral interrupt request outputs 142), respectively, received by peripheral interrupt controller (PIC) 160 to generate interrupt requests to notify CPU 110 that service is needed.

DMA controller (DMAC) 150 is coupled to secondary expansion bus 194 and is configured to perform DMA transfers between peripheral devices 140 and system memory 120 in response to being programmed by CPU 110. DMA controller 150 generates interrupt requests on DMA interrupt request output 152 which is coupled to PIC 160 in order to notify CPU 110 that DMA controller 150 requires service. One prior art embodiment of DMA controller 150 is the 8237A programmable DMA controller produced by the Intel® Corporation.

Peripheral Interrupt Controller (PIC) 160 receives peripheral interrupt request outputs 142 and DMA interrupt request output 152. PIC 160 generates interrupt requests to CPU interrupt request input 112 in order to notify CPU 110 that one or more of peripheral devices 140 or DMA controller 150 requires service. Generally, when CPU 110 receives an interrupt request from PIC 160 on CPU interrupt request input 112, the CPU 110 postpones or temporarily halts the program it is currently executing and invokes an interrupt service routine to service the interrupt request. Once the interrupt request has been serviced, CPU 110 generally returns to executing the program is was previously executing. One prior art embodiment of PIC 160 is the 8259A programmable interrupt controller produced by the Intel® Corporation. PIC 160 also includes interrupt request prioritization and masking capabilities.

Referring to FIG. 2, a flowchart of a prior art method of a CPU performing a read of sector(s) from a hard disk drive using PIO operation is shown. The CPU issues a READ command to the disk drive for specific data in step 202. In response, the drive retrieves the requested data from its media or from a data cache in step 204. When the drive has the requested data available to transfer to system memory, the drive interrupts the CPU in step 206. In response to the drive interrupt request, the CPU invokes the interrupt service routine associated with the drive interrupt request and in step 208 clears the drive interrupt request. The CPU then periodically reads a status register of the drive until the CPU determines that the drive is ready to transfer the requested data in step 210. Once the CPU determines the requested data is available, the CPU performs a PIO transfer of the requested data from the drive to system memory in step 212.

Referring to FIG. 3, a flowchart of a prior art method of a CPU performing a write of sector(s) to a hard disk drive using PIO operation is shown. The CPU issues a WRITE command to the disk drive for specific data in step 302. The CPU then waits for the drive to indicate that it is ready to receive the data, associated with the WRITE command in step 304. Once the CPU determines that the drive is ready to receive the data the CPU performs a PIO transfer of the requested data from system memory to the drive in step 306. In response, the drive stores the received data to its media or a data cache in step 308. Once the drive has stored the data it generates an interrupt to notify the CPU that the data has been stored in step 310. In response to the drive interrupt request, the CPU invokes the interrupt service routine associated with the drive interrupt request and in step 312 clears the drive interrupt request.

Referring to FIG. 4, a flowchart of a prior art method of a CPU performing a read of sector(s) from a floppy disk drive using a DMA transfer is shown. The CPU issues a READ command to the floppy disk drive for specific data in step 402. In response, the floppy disk drive retrieves the requested data from its media in step 404. When the floppy disk drive has the requested data available to transfer to system memory, the disk drive interrupts the CPU in step 406. In response to the drive interrupt request, the CPU invokes the interrupt service routine associated with the drive interrupt request and in step 408 clears the drive interrupt request. Next the CPU programs the DMA controller to perform a DMA transfer of the requested data from the drive to system memory in step 410. The DMA controller performs the DMA transfer in step 412 and interrupts the CPU in step 414 to notify the CPU that the DMA transfer has completed. In response to the drive interrupt request, the CPU invokes the interrupt service routine associated with the DMA controller interrupt request and in step 416 clears the DMA controller interrupt request. Typically the DMA controller interrupt service routine would then perform steps (not shown) related to notifying the floppy disk device driver of the completion of the DMA transfer.

Referring to FIG. 5, a flowchart of a prior art method of a CPU performing a write of sector(s) to a floppy disk drive using a DMA transfer is shown. The CPU issues a WRITE command to the floppy disk drive for specific data in step 502. Next, the CPU programs the DMA controller to perform a DMA transfer of the requested data from system memory to the drive in step 504. The DMA controller performs the DMA transfer in step 506 and interrupts the CPU in step 508 to notify that CPU that the DMA transfer has completed. In response to the drive interrupt request, the CPU invokes the interrupt service routine associated with the DMA controller interrupt request and in step 510 clears the DMA controller interrupt request. Typically the DMA controller interrupt service routine would then perform steps not shown related to notifying the floppy disk device driver of the completion of the DMA transfer. The drive stores the data to its media in step 512 and once it has done so interrupts the CPU in step 514. In response to the drive interrupt request, the CPU invokes the interrupt service routine associated with the drive interrupt request and in step 516 clears the drive interrupt request.

Referring to FIG. 6, a flowchart of a prior art method of a CPU performing an I/O operation (read or write) of sector(s) to or from a bus mastering device is shown. The CPU issues an I/O command to the device for specific data in step 602. The device then performs the I/O operation including the bus master transfer of the data in step 604. The device then interrupts the CPU in step 606 to notify the CPU of the completion of the I/O. In response to the device interrupt request, the CPU invokes the interrupt service routine associated with the device interrupt request and in step 608 clears the device interrupt request.

The CPU may perform other steps in the interrupt service routines such as checking for and processing error conditions, issuing other commands, notifying the operating system of the completion of the commands, etc. which are not shown in FIGS. 2 through 6.

As can be readily observed from the foregoing discussions, bus mastering peripheral devices generally foster the real-time functionality of a system to a greater degree than PIO or DMA transfer devices. This is due to the fact that bus master peripheral devices do not require the CPU to be involved in the data transfer as do PIO devices, and bus master transfers typically generate fewer CPU interrupt requests per I/O operation. However, there is an added cost associated with the circuitry which provides the peripheral device with the capability to perform bus master data transfers. In contrast, a central DMA resource in the system which performs DMA transfers alleviates the need for the system to have more expensive bus mastering peripherals and thus has the advantage of providing an overall system cost savings.

Hence, a system and method is desired which employs the advantages of both bus mastering peripherals and DMA transfer devices, while mitigating their disadvantages and those of PIO devices. A system and method is generally desired which alleviates the CPU from having to perform data transfers between peripheral devices and system memory, without generating more interrupt requests to the CPU, in order to improve the real-time characteristics of the system and without burdening the peripheral devices with additional cost.

SUMMARY OF THE INVENTION

The present invention comprises an improved DMA controller for performing DMA transfers between a peripheral device of a computer system and the system's memory and a method of employing the improved DMA controller. The DMA controller removes the burden from the system's CPU of performing the data transfer and frees the CPU to perform other tasks, such as servicing real-time events. According to the present invention, the DMA controller is configured to selectively inhibit the peripheral device from interrupting the CPU when the peripheral device requires service. Instead the DMA controller receives and services the interrupt request from the peripheral much as the CPU would in an interrupt service routine, again unburdening the CPU to perform other tasks. Also, the DMA controller is configured to generate an interrupt request to the CPU to notify the CPU that service is required, typically due to the completion of a DMA transfer which was previously requested by the CPU. Finally, the DMA controller is configured to selectively allow the peripheral device to interrupt the CPU. The DMA controller is programmable by the CPU to perform the aforementioned operations.

Broadly speaking, the present invention comprises a computer system with one or more buses for transferring data, and a CPU, system memory and a plurality of peripheral devices interconnected by the various buses. Each of the peripheral devices includes one or more peripheral interrupt request outputs. The system further includes a programmable DMA controller coupled to a bus which receives the peripheral interrupt request outputs. The DMA controller is configured to perform a DMA transfer on the one or more buses between two or more devices, including the system memory and the plurality of peripheral devices. The CPU programs the DMA controller to start the DMA transfer in response to one of the plurality of peripheral devices generating an interrupt request on its interrupt request output or to start the DMA transfer immediately.

Additionally, the system may include a peripheral interrupt controller (PIC) coupled to the CPU. The PIC includes a plurality of PIC interrupt request inputs coupled to the DMA controller. The DMA controller is configured to selectively couple the peripheral interrupt request outputs from the peripheral devices to the plurality of PIC interrupt request inputs of the PIC, to selectively decouple the peripheral interrupt request outputs from the peripheral devices from the plurality of PIC interrupt request inputs of the PIC, and to selectively generate a plurality of interrupt requests on the plurality of PIC interrupt request inputs of the PIC when the peripheral interrupt request outputs from the peripheral devices are decoupled from the plurality of PIC interrupt request inputs.

The present invention further comprises methods for performing data transfers in the present invention described employing the novel capabilities of the system to improve the real-time characteristics of the system.

BRIEF DESCRIPTION OF THE DRAWINGS

A better understanding of the present invention can be obtained when the following detailed description of the preferred embodiment is considered in conjunction with the following drawings, in which:

FIG. 8 is a diagram of the programmable register set of a DMA controller according to one embodiment of the present invention.

Figure 1:
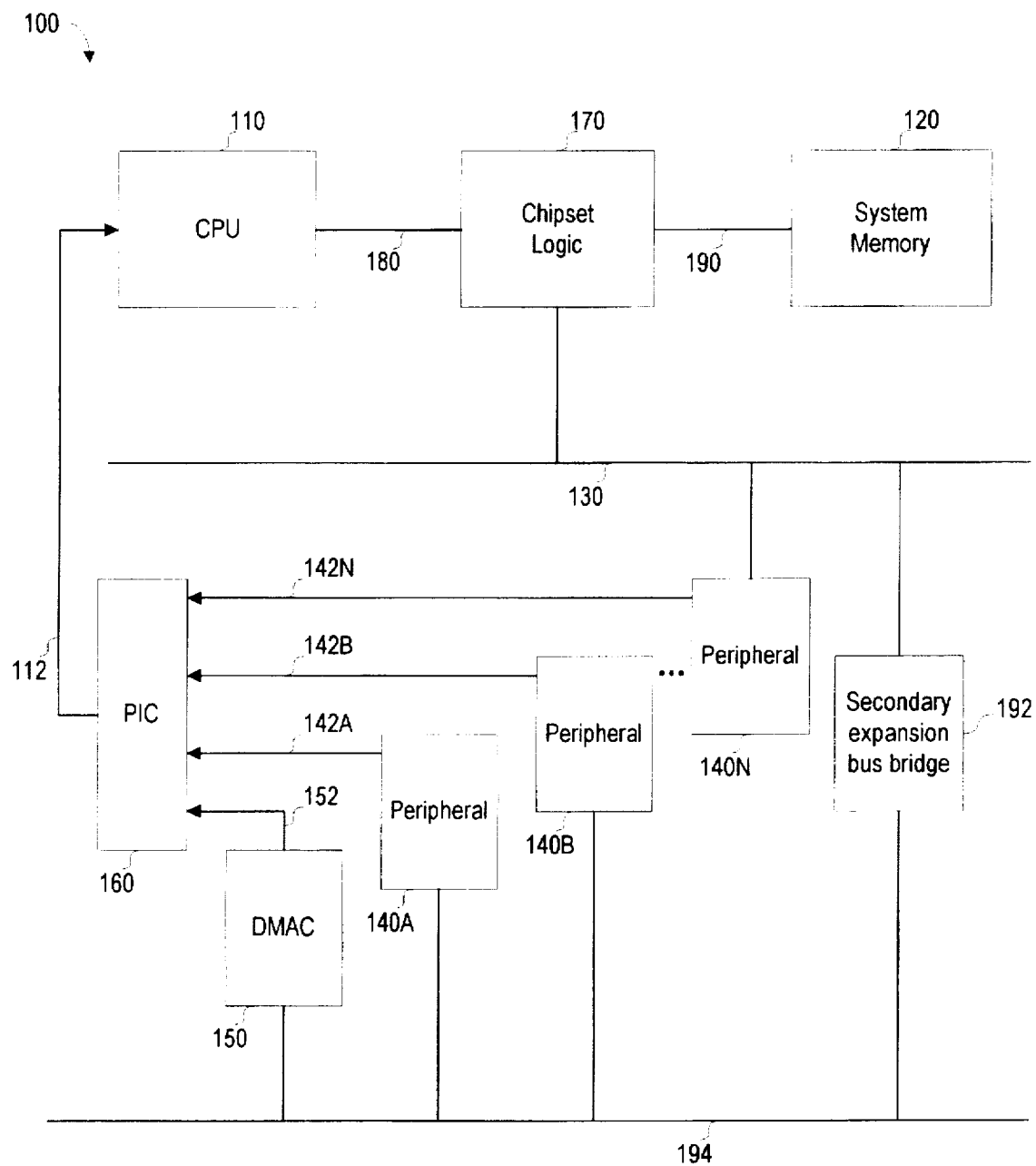
FIG. 1 is a block diagram of a computer system with a DMA controller and PIC according to the prior art.
Figure 2:
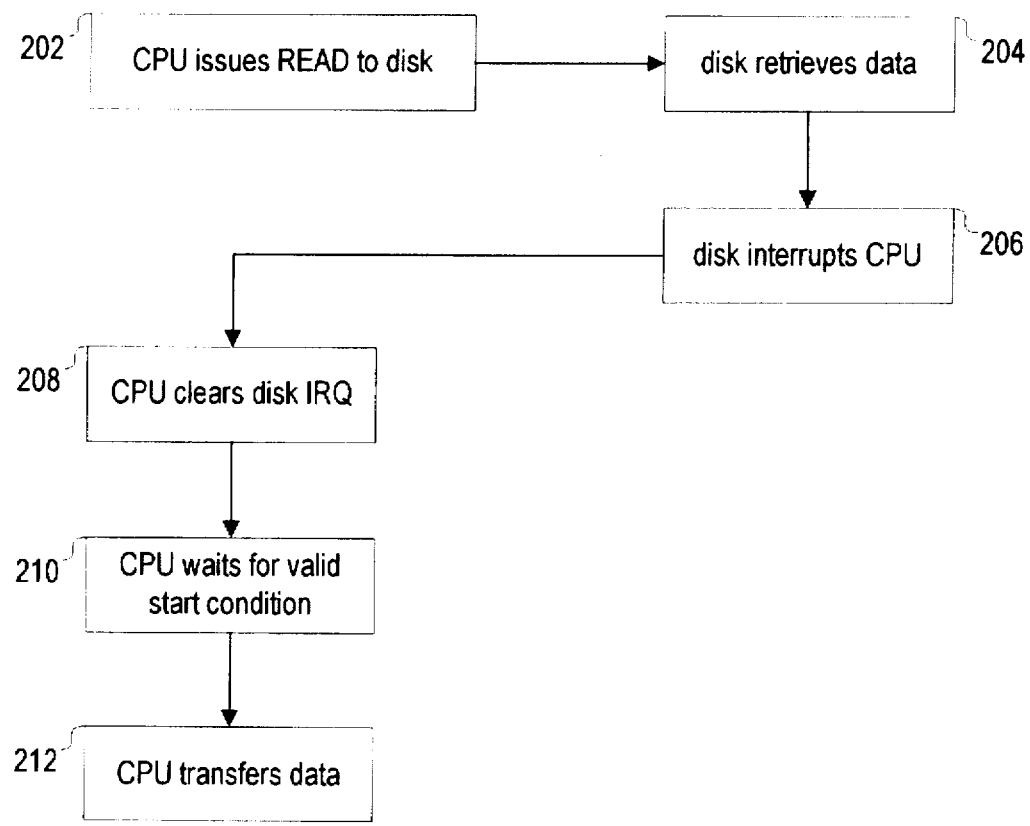
FIG. 2 is a flowchart illustrating steps taken by a device driver in reading a sector from a typical AT interface disk drive using PIO operations according to the prior art.
Figure 3:
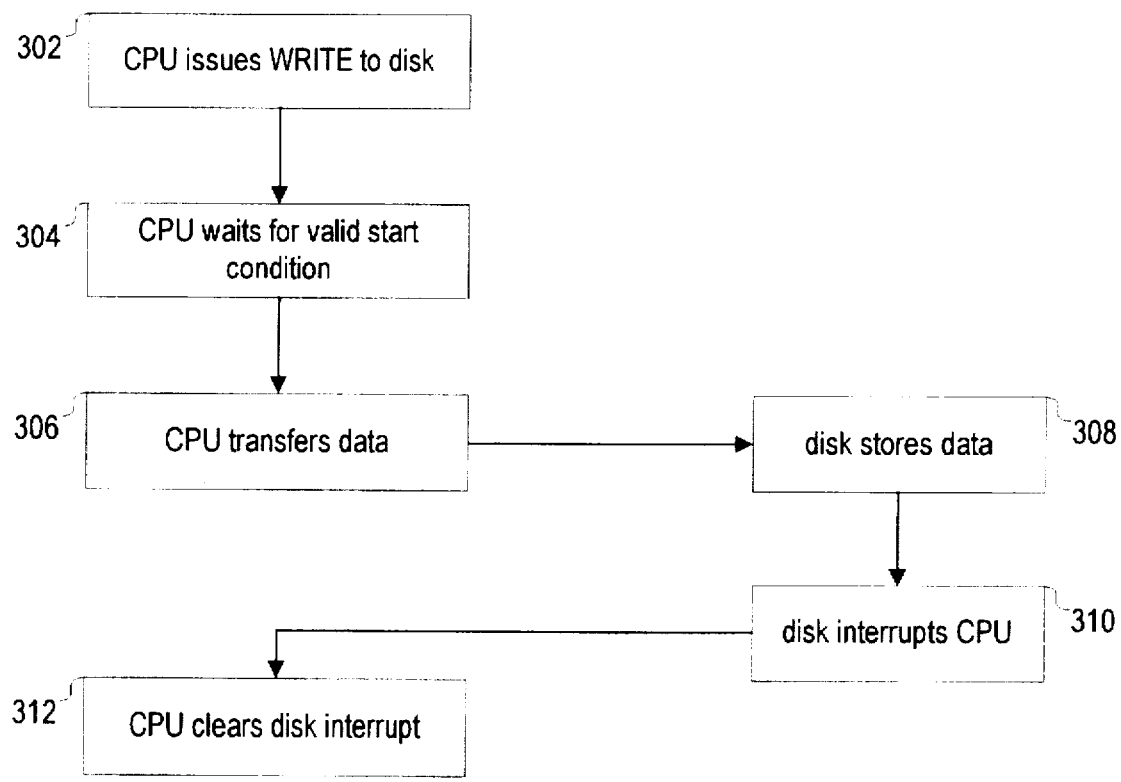
FIG. 3 is a flowchart illustrating steps taken by a device driver in writing a sector to a typical AT disk drive using PIO operations according to the prior art.
Figure 4:
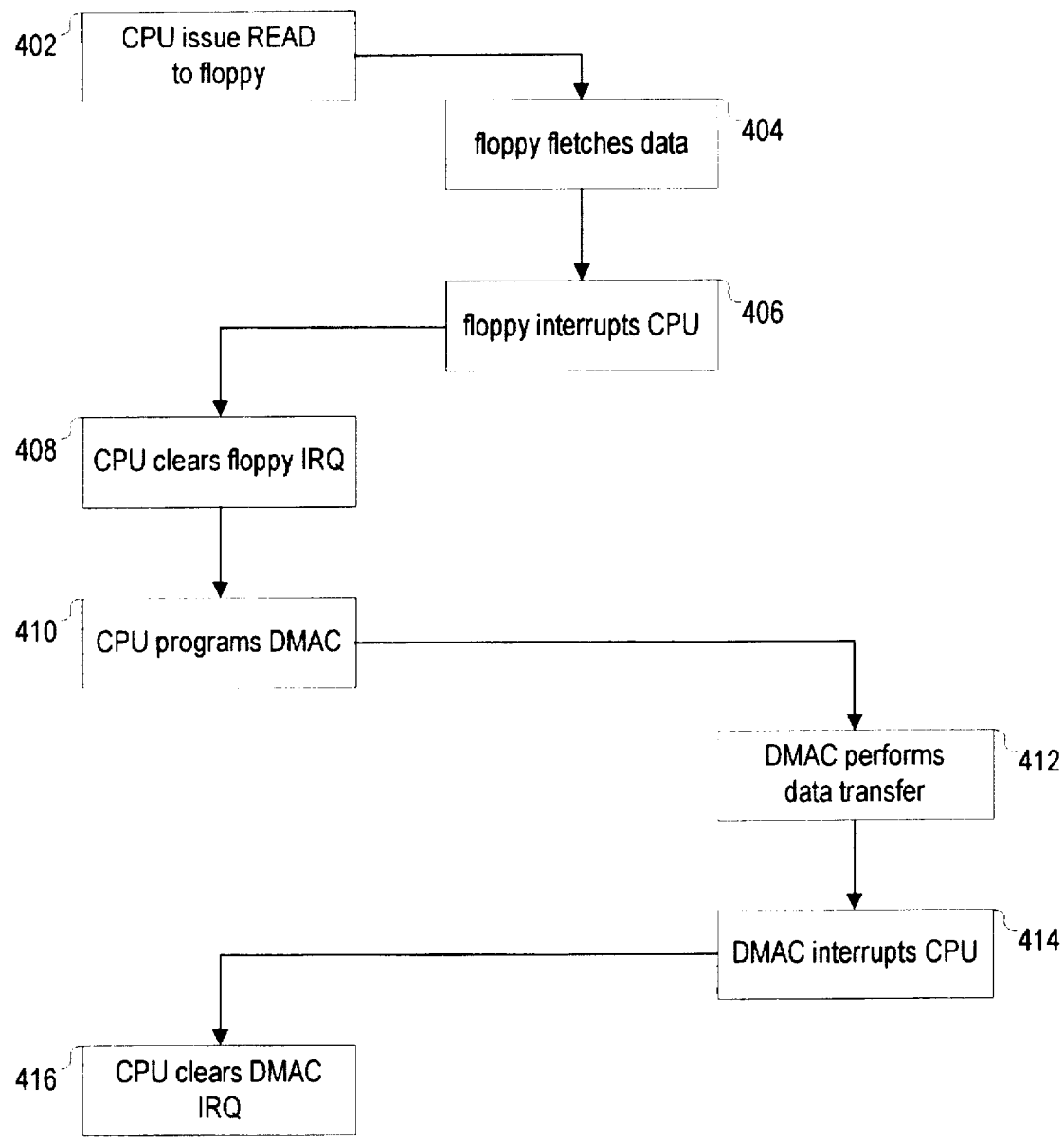
FIG. 4 is a flowchart illustrating steps taken by a device driver in reading a sector from a typical floppy disk drive using DMA transfer operations according to the prior art.
Figure 5:
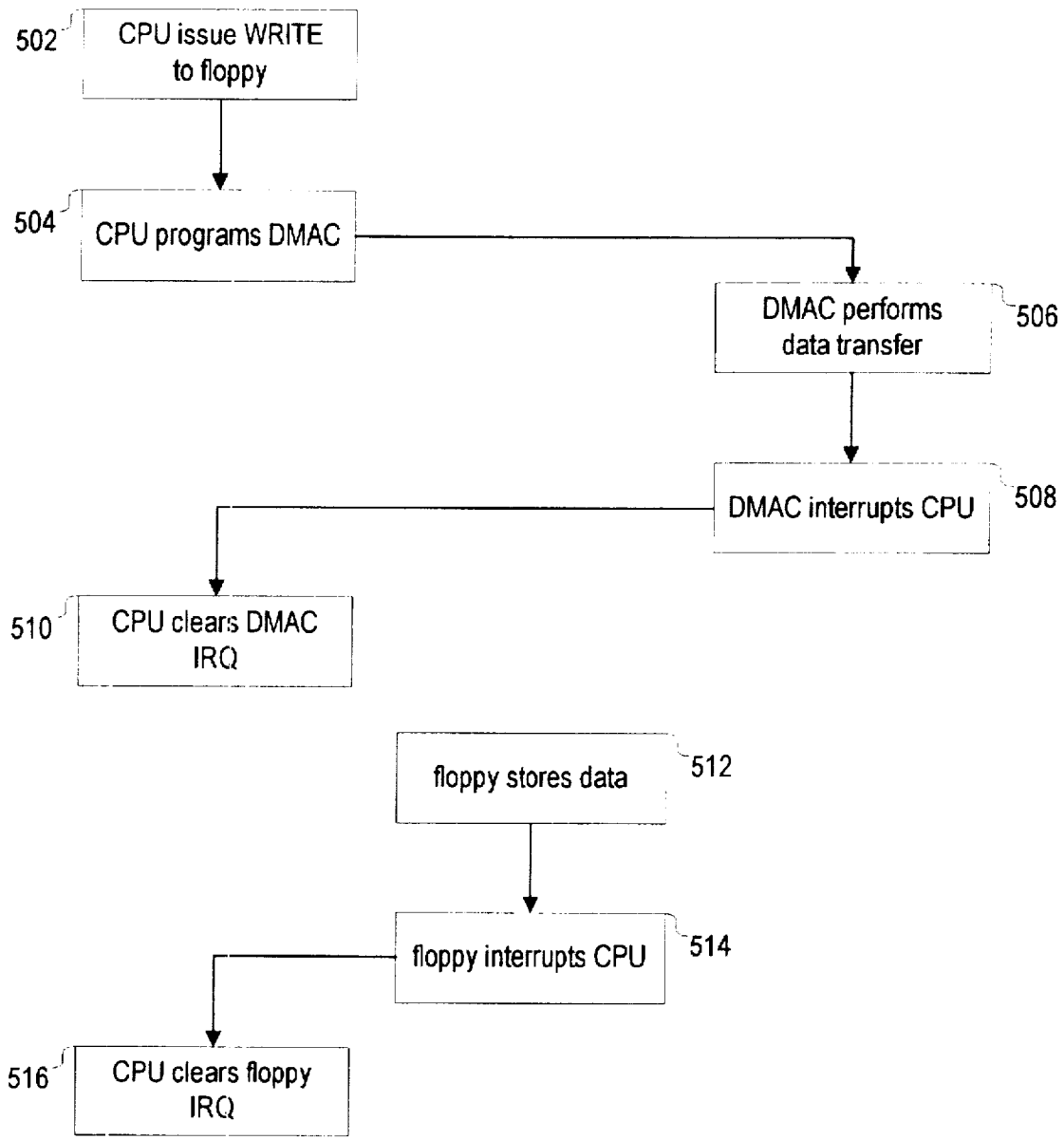
FIG. 5 is a flowchart illustrating steps taken by a device driver in writing a sector to a typical floppy disk drive using DMA transfer operations according to the prior art.
Figure 6:
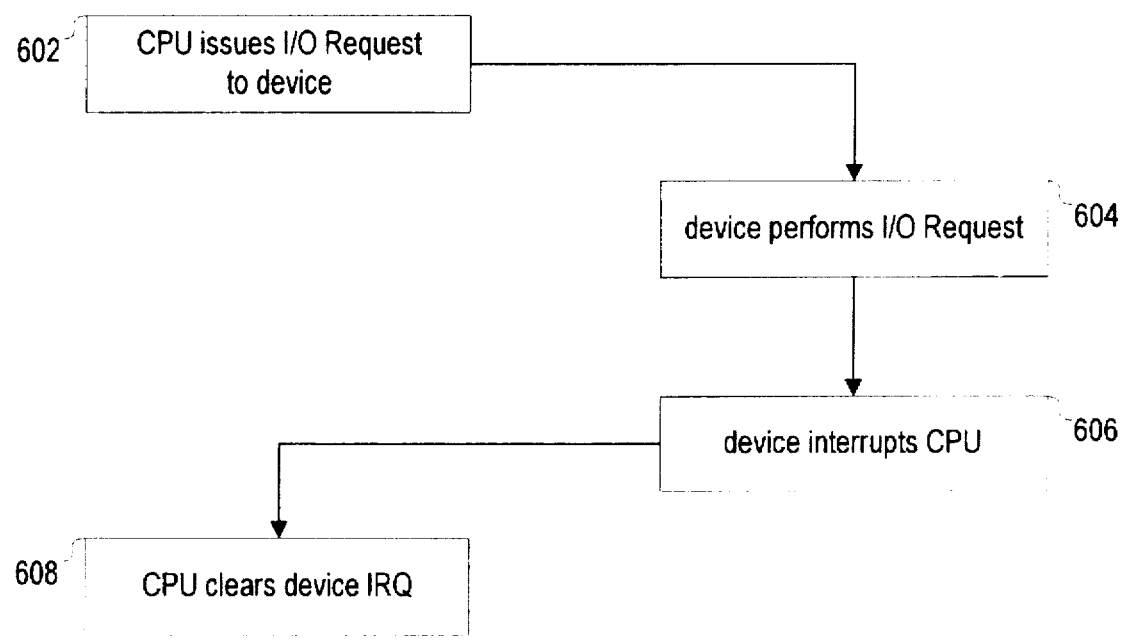
FIG. 6 is a flowchart illustrating steps taken by a device driver in performing I/O operations such as reads and writes with a bus mastering peripheral device according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 7:
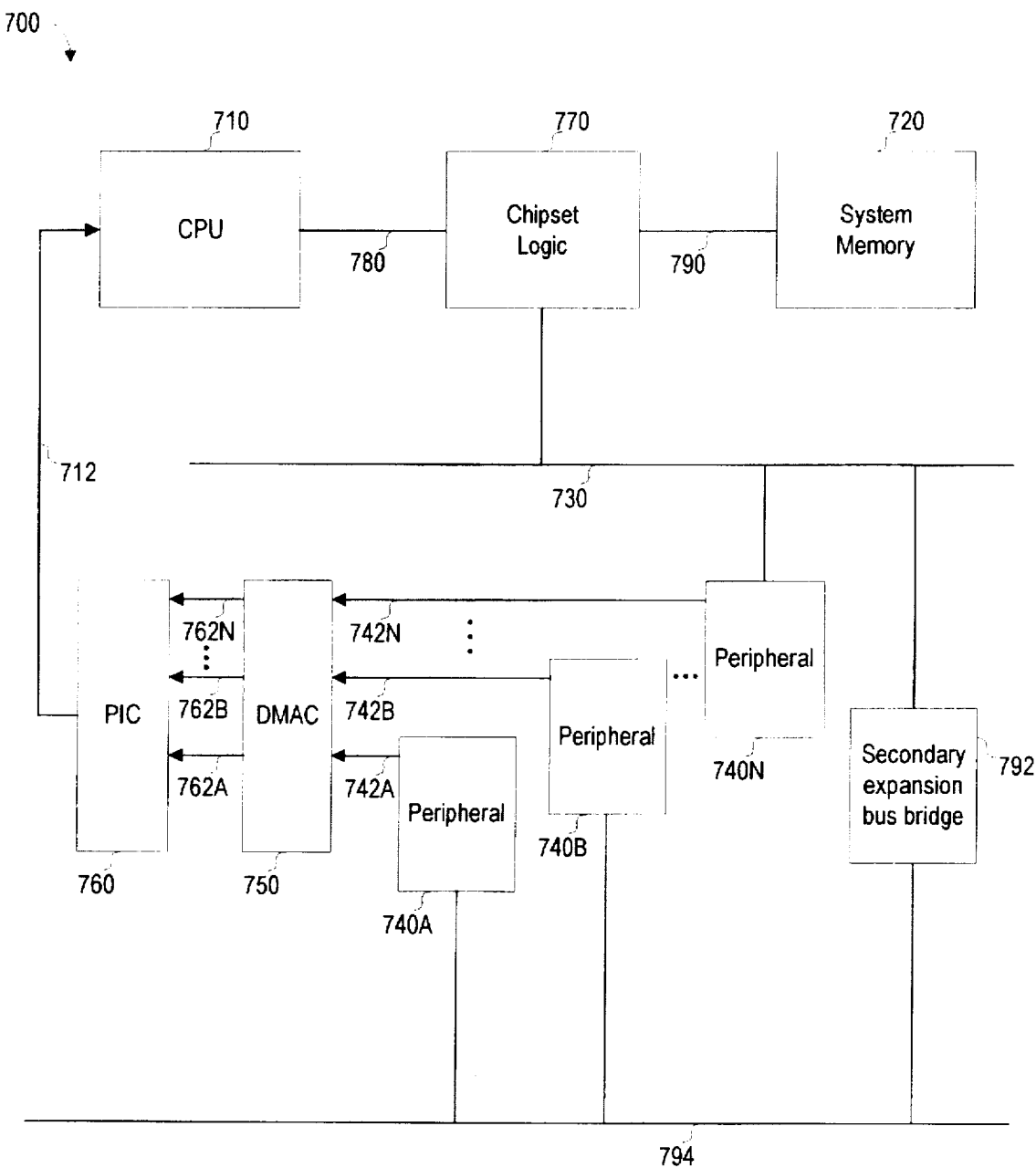
FIG. 7 is a block diagram of a computer system with a DMA controller and PIC according to one embodiment of the present invention.

Referring now to FIG. 7, a block diagram of the preferred embodiment of the present invention is shown. The computer system 700 includes a CPU 710 coupled through a host bus 780 to chipset logic 770. A system memory 720 is coupled through a memory bus 790 to chipset logic 770. The CPU 710 and system memory 720 are coupled through chipset logic 770 to an expansion bus 730. In one embodiment CPU 710 is a microprocessor with an Intel® x86-style architecture. System memory 720 comprises a plurality of digital storage elements, such as Dynamic Random Access Memory (DRAM) or Static Random Access Memory (SRAM). In the preferred embodiment expansion bus 730 is a PCI bus. However, it is noted that expansion bus 730 may conform to a variety of bus standards such as the Industry Standard Architecture (ISA), Extended Industry Standard Architecture (EISA), Microchannel Architecture (MCA) or any other expansion bus. The relatively large data transfer rates of the PCI bus is compatible with the requirements associated with multimedia audio and video data streams which must be transferred on expansion bus 730.

A secondary expansion bus bridge 792 couples expansion bus 730 to a secondary expansion bus 794. In one embodiment, secondary expansion bus 794 is an ISA bus, and secondary expansion bus bridge 792 is an ISA bus bridge.

A plurality of peripheral devices 740A-740N (referred to collectively as peripheral devices 740) are coupled to expansion bus 730 and/or secondary expansion bus 794 and are typically devices such as hard disk drives, CD-ROM drives, floppy disk drives, video adapters, DMA controllers, serial ports, parallel ports or other devices as are well known in the art. Peripheral devices 740 include peripheral interrupt request outputs 742A-742N (referred to collectively as peripheral interrupt request outputs 742) received by DMA controller 750 to generate interrupt requests to notify CPU 710 that service is needed. It is noted that peripheral devices 740 may include one or more peripheral interrupt request outputs.

Peripheral Interrupt Controller (PIC) 760 is coupled to DMA controller 750 by plurality of PIC interrupt request inputs 762A-762N (referred to collectively as PIC interrupt request inputs 762). In response to interrupt requests generated by DMA controller 750 on PIC interrupt request inputs 762, PIC 760 generates interrupt requests on CPU interrupt request input 712 in order to notify CPU 710 that one or more of peripheral devices 740 or DMA controller 750 requires service. When PIC 760 generates an interrupt request to CPU 710 and CPU 710 acknowledges the interrupt request, PIC 760 communicates the interrupt request (IRQ) level to CPU 710 associated with the interrupt source which is generating the interrupt request on one of PIC interrupt request inputs 762. Alternately stated, each of PIC interrupt request inputs 762 has an associated interrupt request (IRQ) level. CPU 710 uses the IRQ level to determine which interrupt service routine to invoke in response to the interrupt request.

It is noted that in the present invention, unlike the prior art, PIC 760 does not receive peripheral interrupt request outputs 742 directly, but rather selectively and indirectly through DMA controller 750 as will be discussed shortly. Since PIC 760 receives peripheral interrupt request outputs 742 selectively and indirectly, each of peripheral interrupt request outputs 742 consequently has an associated IRQ level.

Generally, when CPU 710 receives an interrupt request from PIC 760 on CPU interrupt request input 712 CPU 710 postpones the program it is currently executing and invokes an interrupt service routine to service the interrupt request. Once the interrupt request has been serviced, CPU 710 generally returns to executing the program it was previously executing. PIC 760 is similar in functionality to well known peripheral interrupt controllers in the art. An example of such a PIC is the 8259A programmable interrupt controller produced by the Intel® Corporation.

DMA controller 750 is coupled to expansion bus 730 and is configured to perform DMA transfers on expansion bus 730 between peripheral devices 740 and system memory 720 or other peripheral devices 740 in response to CPU 710 programming registers shown in FIG. 8 and in response to interrupt requests received on peripheral interrupt request outputs 742.

Referring to FIG. 8, register set 800 of the preferred embodiment of the present invention which CPU 710 (of FIG. 7) programs in order to perform a DMA transfer is shown. DMA transfers are well known in the art. Broadly speaking, a DMA transfer consists of a DMA controller loading a specified number of bytes of data from a source address and storing the data to a destination address. In the preferred embodiment of the present invention, CPU 710 programs the number of bytes to be transferred in byte count register 802. It is noted that the implementation of how DMA controller 750 (of FIG. 7) performs individual loads and stores of DMA transfer data is in part a function of the implementation of expansion bus 730 (of FIG. 7). Examples are whether burst transfers are allowed, and whether memory. I/O or other type cycles should be performed. The CPU programs such information in cycle-type register 870.

Typically in a DMA transfer, the DMA controller loads one or more words of data and then stores one or more words of data. Word sizes are commonly a single byte word, a two-byte word, a four-byte word or an eight-byte word. However, the present invention in no way restricts the size of words transferred in the DMA transfer. It is also noted that the size of the word loaded from the source address may be different from the size of the word stored to the destination address. This is largely due to the fact that different peripherals and system memory may only support loads and stores which are of certain word sizes. Additionally, differing word sizes may be a function of the implementation of expansion bus 730. CPU 710 programs the word sizes in cycle-type register 870.

In the preferred embodiment of the present invention the expansion bus is a PCI bus. The present invention contemplates including buffers in DMA controller 750 for improving efficiency of transfers on expansion bus 730. The buffers allow DMA controller 750 to load multiple words before storing the words.

CPU 710 programs source address register 804 with the expansion bus address which DMA transfer data will be loaded from. Additionally, CPU 710 programs destination address register 806 with the expansion bus address which DMA transfer data will be stored to. In the case where the source or destination address is system memory. DMA controller 750 increments the address which it supplies on expansion bus 730 by the word size after each word transfer. However, typically in the case where the source or destination is a peripheral device the address is fixed, commonly at a fixed I/O cycle address, hence DMA controller 750 does not increment the address which it supplies on expansion bus 730 after each word transfer. CPU 710 programs increment source address register 808 and increment destination address register 810 to indicate whether or not to increment the respective expansion bus address after a word transfer.

CPU 710 reads status register 812 to determine the status of DMA controller 750, particularly whether a DMA transfer is in progress, has completed or whether or not an error has occurred.

In the present invention, register set is used to denote broadly a collection of storage locations. The collection of storage locations contemplates, for example, registers or latches, which are common in the art, or memory such as DRAM or SRAM. Likewise, the registers described in FIG. 8 are intended to describe the functionality of register set 800 rather than the way the functions are grouped. For example, increment source address register 808 and increment destination address register 810 may be implemented as each single bits within a common latch or SRAM location.

Referring again to FIG. 7, DMA controller 750 receives peripheral interrupt request outputs 742. DMA controller 750 is configured to selectively couple peripheral interrupt request outputs 742 to PIC interrupt request inputs 762, that is, to pass-through signals generated on peripheral interrupt requests 742 to PIC interrupt request inputs 762. In a default mode DMA controller 750 is configured to couple peripheral interrupt request outputs 742 to PIC interrupt request inputs 762. Typically, upon completion of an I/O request associated with one of peripheral devices 740. CPU 710 programs DMA controller 750 to couple peripheral interrupt request outputs 742 to PIC interrupt request inputs 762 as will be discussed in the discussion of flowcharts which will follow.

Additionally, DMA controller 750 is advantageously configured to selectively decouple peripheral interrupt request outputs 742 from PIC interrupt request inputs 762. DMA controller 750 selectively decouples peripheral interrupt request outputs 742 for two purposes.

The first purpose of DMA controller 750 selectively decoupling peripheral interrupt requests 742 is to inhibit a peripheral device of 740 from interrupting CPU 710 so that DMA controller 750 may instead receive the interrupt request from the peripheral device and service the interrupt request. Upon receiving the interrupt request from the peripheral device, DMA controller 750 is configured to perform some or all of the functions which CPU 710 would have performed in an interrupt service routine, such as clearing the interrupt request on the peripheral device, checking the status of the peripheral device, and performing data transfers to or from the device. DMA controller 750 inhibiting the peripheral device interrupt request and servicing the interrupt request itself reduces the number of interrupts which CPU 710 must service and consequently improves the availability of CPU 710.

The second purpose of DMA controller 750 selectively decoupling peripheral interrupt requests 742 is for DMA controller 750 to selectively generate interrupt requests on PIC interrupt request inputs 762. DMA controller 750 is configured to generate interrupt requests on PIC interrupt request inputs 762, in order to notify CPU 710 that DMA controller 750 has completed a DMA transfer or some other change in status has occurred. CPU 710 receives the interrupt request generated by DMA controller 750 and invokes the interrupt service routine associated with the peripheral device with which DMA controller 750 performed the DMA transfer. The interrupt service routine clears the interrupt request generated by DMA controller 750 and services the interrupt. Details of how DMA controller 750 generates these interrupts and CPU 710 clears those interrupts will be described more rigorously in the further discussion of FIG. 8.

It is noted that if the operating system which executes on the system described is configured such that multiple peripheral devices and their associated device drivers utilize DMA controller 750, some means of arbitrating for and allocating DMA controller 750 must be employed by the operating system. Many solutions have already been proposed and implemented in the art of operating system development.

In one embodiment of the present invention DMA controller 750 is configured with a plurality of 2-to-1 multiplexers, which are well known in the art, as the means to selectively couple or decouple peripheral interrupt requests 742 to or from PIC interrupt request inputs. One multiplexer is associated with each PIC interrupt request input. A given multiplexer has two inputs, one output and a selection input. The multiplexer output is coupled to a PIC interrupt request input. One of the multiplexer inputs is coupled to a peripheral interrupt request output. The other multiplexer input is coupled to circuitry within the DMA controller for generating DMA interrupt requests. Circuitry within the DMA controller controls the multiplexer select input to selectively couple the peripheral interrupt request output or the circuitry for generating DMA interrupt requests to the PIC interrupt request input.

It is noted that, unlike prior art DMA controllers, DMA controller 750 does not include a distinct interrupt request output. Rather, DMA controller 750 selectively borrows the interrupt request line of the peripheral device for which it is performing the DMA transfer. However, it is noted that in an alternate embodiment of the invention DMA controller 750 may have a distinct interrupt request output. In such case, CPU 710 has an interrupt service routine associated with the DMA controller's distinct interrupt request.

It is noted that, as an alternate embodiment, CPU interrupt request input 712 could instead be a plurality of CPU interrupt request inputs and PIC 760 may be configured to generate a plurality of interrupt requests on the plurality of CPU interrupt request inputs. Further it is noted that PIC 760 may even be absent and instead DMA controller 750 may be coupled directly to the plurality of CPU interrupt request inputs and the CPU itself has means for masking and prioritizing interrupt requests.

Referring again to FIG. 8, CPU 710 programs start-on-interrupt register 822 to a start on interrupt value to instruct DMA controller 750 to start a DMA transfer, as described in other registers of DMA controller 750, upon receiving an interrupt request on the peripheral interrupt request output associated with the value which CPU 710 programs in IRQ transfer level register 824. Conversely, CPU 710 may program start-on-interrupt register 822 to a start immediate value to instruct DMA controller 750 to start the DMA transfer immediately, rather than waiting to receive the peripheral device interrupt request.

When CPU 710 programs start-on-interrupt register 822 to the start on interrupt value, DMA controller 750 decouples one of peripheral device interrupt request outputs 742 (of FIG. 7) associated with the value in the IRQ transfer level register 824 from its corresponding PIC interrupt request input. Hence, CPU 710 is not interrupted by the associated peripheral device generating an interrupt request and DMA controller 750 is free to receive and service the interrupt request generated by the peripheral device.

Upon receiving the interrupt request from the peripheral device, DMA controller 750 clears the interrupt request on the peripheral device. Typically, peripheral devices have their interrupts cleared by reading from or writing a particular value to a specific address in the peripheral's address space. This read or write may be an I/O cycle or memory cycle. CPU 710 programs the address to be accessed to clear the peripheral interrupt request into peripheral interrupt clear address register 826. CPU 710 programs the value to be written at the interrupt clear address (in the case of a write operation to clear the interrupt) into peripheral interrupt clear value register 828. CPU 710 programs peripheral interrupt clear operation register 830 to specify the type of expansion bus cycle which DMA controller 750 performs to clear the peripheral device interrupt request. In the preferred embodiment expansion bus 730 is a PCI bus and common cycles used in clearing peripheral interrupt requests are I/O Read, I/O Write, Memory Read and Memory Write cycles.

Once DMA controller 750 has cleared the interrupt request on the peripheral device, DMA controller 750 couples the peripheral device interrupt request output associated with the value in IRQ transfer level register 824 to its corresponding PIC interrupt request input.

CPU 710 programs interrupt-on-transfer-complete register 842 with an interrupt on transfer complete value to instruct DMA controller 750 to generate an interrupt request on the one of PIC interrupt request inputs 762 (of FIG. 7) associated with the value in IRQ transfer level register 824 upon completion of the DMA transfer. Before generating the interrupt request, DMA controller 750 decouples the one of peripheral device interrupt request outputs 742 (of FIG. 7) associated with the value in the IRQ transfer level register 824 from its corresponding PIC interrupt request input.

In response to the DMA transfer complete interrupt request generated by DMA controller 750, CPU 710 invokes an interrupt service routine associated with the peripheral device with which DMA controller 750 performed the DMA transfer. The interrupt service routine clears the interrupt request generated by DMA controller 750 by accessing interrupt request clear register 844. When CPU 710 accesses interrupt request clear register 844 to clear the interrupt request generated by DMA controller 750, DMA controller 750 stops generating an interrupt request and couples the one of peripheral device interrupt request outputs 742 associated with the value in IRQ transfer level register 824 to its corresponding PIC interrupt request input, and updates the contents of status register 812 to no longer indicate that a DMA transfer has completed.

One of the functions which interrupt service routines commonly perform is checking for valid start conditions before performing a data transfer. An example of such a valid start condition is some subset of bits in a status register of the peripheral device having a predetermined value. The interrupt service routine periodically polls the status register and compares the appropriate bits in the status register to determine if the predetermined value is present. The preferred embodiment of the present invention contemplates a similar function.

When CPU 710 desires to have DMA controller 750 perform a DMA transfer only in the presence of a valid start condition, CPU 710 programs transfer-only-on-valid-start-condition register 852 with a true value to instruct DMA controller 750 to periodically check for the presence of a valid start condition and postpone the DMA transfer until such a condition exists. CPU 710 programs valid start condition address register 854 with the expansion bus address at which DMA controller 750 is to poll for a valid start condition value. CPU 710 programs valid start condition value register 856 with a value to be compared with the value polled from the address specified in valid start condition address register 854. CPU 710 programs valid start condition mask register 858 with a mask value such that DMA controller 750 only compares bits between the polled value and the value in valid start condition value register 856 which correspond to a logical one in the mask value. CPU 710 programs valid start condition period register 862 with a value to instruct DMA controller 750 as to the frequency with which DMA controller 750 polls for a valid start condition. Providing a programmable polling frequency allows CPU 710 to determine with what resolution DMA controller 750 detects a valid start condition while not polling too frequently such that DMA controller 750 consumes an inordinate amount of expansion bus 730 bandwidth.

To further clarify the function of DMA controller 750 checking for a valid start condition, an example is given for an IDE disk drive. In this case CPU 710 would program valid start condition address register 854 with 0×1f7, which is commonly the address of an IDE disk drive Status Register. CPU 710 would program valid start condition value register 856 with a value of 0×08. This value corresponds to the Data Request (DRQ) bit of the Status Register being set and the Drive Busy (BSY) bit of the Status Register being clear. CPU 710 would program valid start condition mask register 858 with a value 0×88 to denote that only the DRQ and BSY bits of the Status Register should be compared with the value in the valid start condition value register.

Although the preferred embodiment of the present invention is configured to check for one valid start condition, it is noted that some peripheral devices may require checking for more complex valid start conditions. Hence, it is recognized that a more complex means for checking for a plurality of valid start conditions may be included in another embodiment of the invention.

Figure 9:
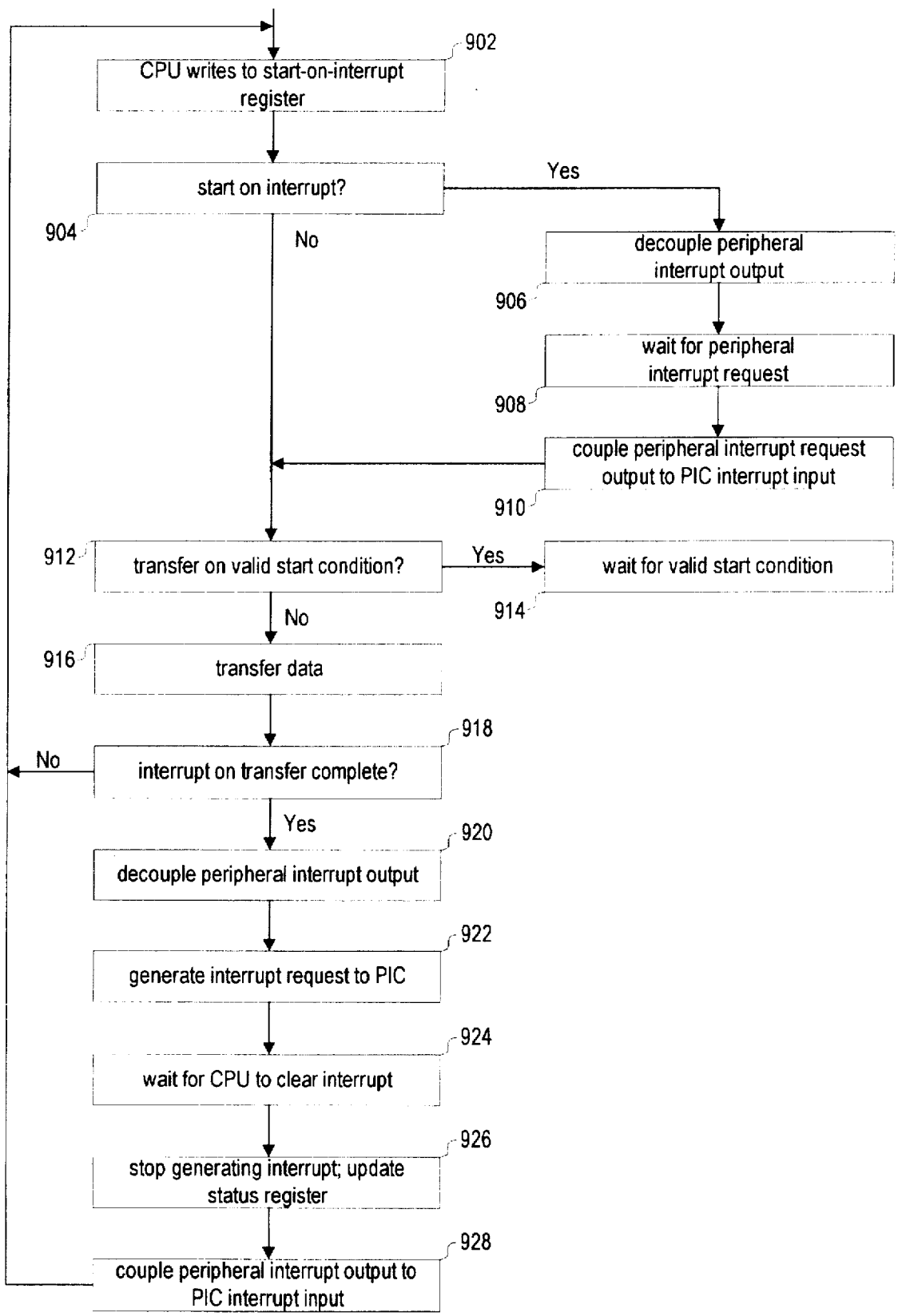
FIG. 9 is a flowchart illustrating steps taken by a DMA controller in performing a data transfer according to one embodiment of the present invention.

Referring now to FIG. 9, a flowchart illustrating steps taken by DMA controller 750 (of FIG. 7) in performing a data transfer according to the preferred embodiment of the present invention is shown. In step 902 CPU 710 (of FIG. 7) writes to start-on-interrupt register 822 (of FIG. 8) with a value. DMA controller 750 determines if the value written is a start on interrupt value in step 904. If so, DMA controller 750 decouples the one of peripheral interrupt request outputs 742 (of FIG. 7) corresponding to the IRQ transfer level in IRQ transfer level register 824 (of FIG. 8) from its corresponding one of PIC interrupt request inputs 762 (of FIG. 7) in step 906. DMA controller 750 then waits for the peripheral device to generate an interrupt request on its peripheral interrupt request output in step 908. DMA controller 750 then couples the peripheral interrupt request output corresponding to the IRQ transfer level in IRQ transfer level register 824 to its corresponding PIC interrupt request in step 910.

After step 910, or if DMA controller 750 determines in step 904 that the value in start-on-interrupt register 822 is not the start on interrupt value, DMA controller 750 determines if transfer-only-on-valid-start condition register 852 (of FIG. 8) has a true value in step 912. If so, DMA controller 750 polls until it detects a valid start condition in step 914. Once DMA controller 750 detects a valid start condition, or if DMA controller 750 determines transfer-only-on-valid-start condition register 852 does not have a true value in step 912, DMA controller 750 performs a DMA transfer of the number of bytes specified in byte count register 802 from the expansion bus address in source address register 804 to the expansion bus address in destination address register 806 as specified in increment-source-address register 808, increment-destination-address register 810, and cycle-type register 870 in step 916.

After step 916, DMA controller 750 determines whether interrupt-on-transfer-complete register 842 (of FIG. 8) has a interrupt on transfer complete value in step 918. If not, DMA controller 750 returns to step 902 to wait for another write by CPU 710 to start-on-interrupt register 822. If DMA controller 750 determines interrupt-on-transfer-complete register 842 has a interrupt on transfer complete value in step 918, DMA controller 750 decouples the one of peripheral interrupt request outputs 742 corresponding to the IRQ transfer level in IRQ transfer level register 824 from its corresponding one of PIC interrupt request inputs 762 in step 920. Next, DMA controller 750 generates an interrupt request on the PIC interrupt request input corresponding to the IRQ transfer level in IRQ transfer level register 824 in step 922. Next DMA controller 750 waits for CPU 710 to clear the interrupt request by accessing interrupt request clear register 844 in step 924. When DMA controller 750 detects that CPU 710 has cleared the interrupt, DMA controller 750 stops generating the interrupt request and updates status register 812 accordingly in step 926. Then, DMA controller 750 couples the peripheral interrupt request output to its corresponding PIC interrupt request input in step 928.

Referring again to FIG. 8, scatter-gather register 882 is shown. It is well known in the art for DMA controllers to be capable of performing scatter-gather DMA transfers. Broadly speaking, a scatter-gather DMA transfer consists of a DMA controller transferring data from a peripheral device to a discontiguous set of system memory locations or vice versa. The address and length of each element of the set of system memory locations is described in a scatter-gather entry. The list of scatter-gather entries is known as a scatter-gather list. When CPU 710 (of FIG. 7) desires DMA controller 750 to perform a scatter-gather DMA transfer as opposed to a DMA transfer according the values of byte count register 802, source address register 804, and destination address 806. CPU 710 populates a scatter-gather list in system memory 720 (of FIG. 7), programs the expansion bus address of the scatter-gather list in source address register 804, and programs scatter-gather register 882 to a true value.

Another common function of peripheral device interrupt service routines is to detect peripheral device error conditions. An example of such an error condition is some subset of bits in a status register of the peripheral device having a predetermined value. The interrupt service routine reads the status register and compares the appropriate bits in the status register to determine if the predetermined value is present. In the preferred embodiment of the present invention DMA controller 750 contemplates a plurality of registers for detecting peripheral device error conditions.

When CPU 710 desires to have DMA controller 750 to check for an error condition before and after performing a DMA transfer CPU 710 programs check-for-error-condition register 895 with a true value. CPU 710 programs error condition address register 892 with the expansion bus address at which DMA controller 750 is to fetch an error condition value. CPU 710 programs error condition value register 893 with a value to be compared with the value fetched from the address specified in error condition address register 892. CPU 710 programs error condition mask register 894 with a mask value such that DMA controller 750 only compares bits between the fetched value and the value in error condition value register 893 which correspond to a logical one in the mask value. CPU 710 programs interrupt-on-error-condition register 896 to a true value to instruct DMA controller 750 to interrupt CPU 710 upon detection of an error condition.

It is further recognized that multiple peripheral devices may be present in a computer system for which it is desirable for the DMA controller of the present invention to perform DMA transfers simultaneously. Hence, the preferred embodiment of the present invention contemplates a plurality of register sets similar to that described in FIG. 8 for performing a plurality of simultaneous DMA transfers for a plurality of peripheral devices.

Figure 10:
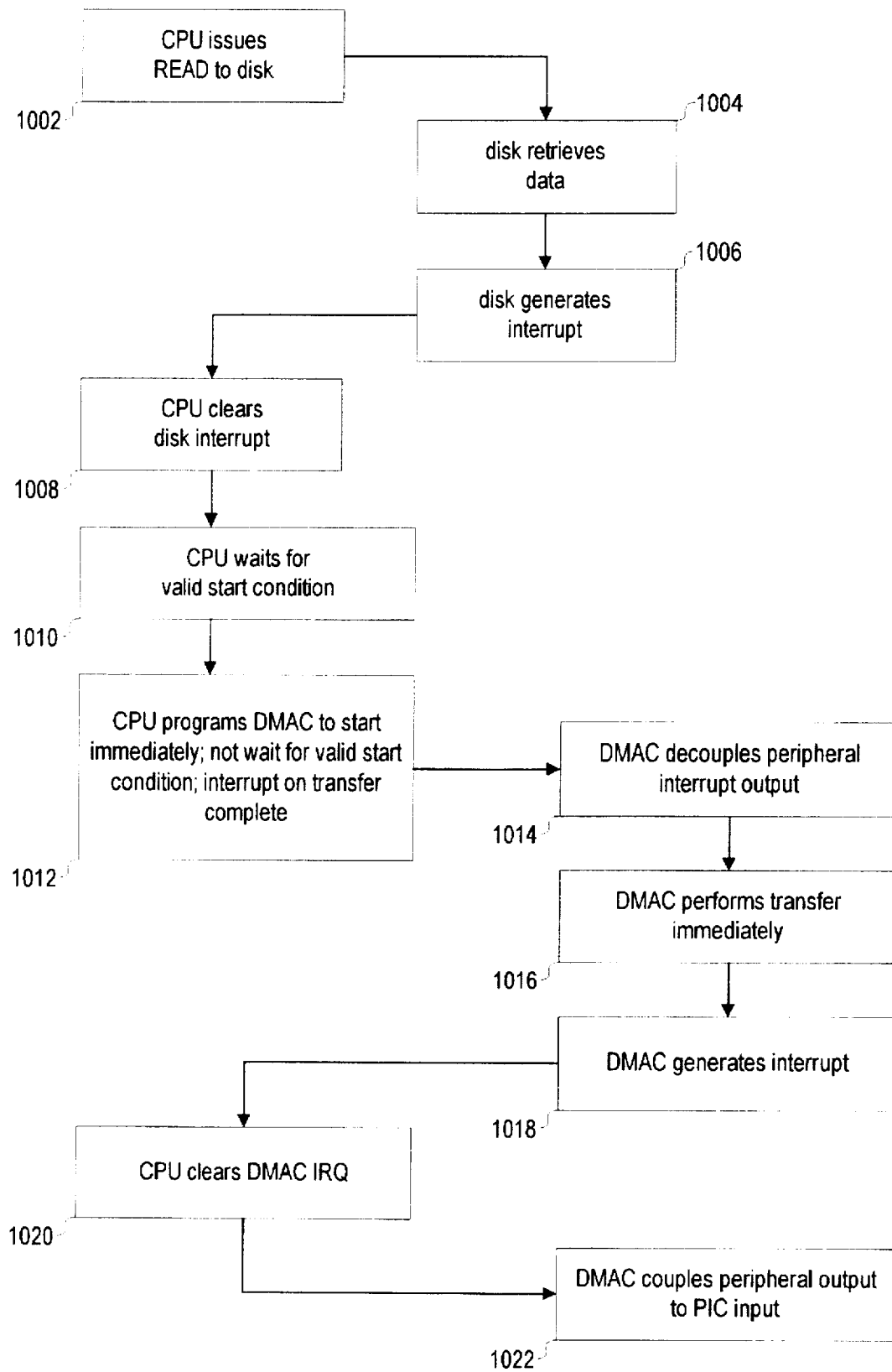
FIG. 10 is a flowchart illustrating steps taken by a device driver in reading a sector from a typical AT disk drive according to one embodiment of the present invention.

Referring now to FIG. 10, a flowchart of a method of employing a system according to the preferred embodiment previously described to perform a read of sector(s) from a hard disk drive according one embodiment of the present invention is shown. The CPU issues a READ command to the disk drive for specific data in step 1002. In response, the drive retrieves the requested data from its media or from a data cache in step 1004. When the drive has the requested data available to transfer to system memory the drive interrupts the CPU in step 1006. In response to the drive interrupt request, the CPU invokes the interrupt service routine associated with the drive interrupt request and in step 1008 clears the drive interrupt request. The CPU then periodically reads a status register of the drive until the CPU determines that the drive is ready to transfer the requested data in step 1010. Once the CPU determines the requested data is available the CPU programs the DMA controller to start a DMA transfer immediately of the requested data from the drive to system memory, not to wait for a valid start condition, and to generate an interrupt upon completion of the DMA transfer in step 1012.

The DMA controller decouples the drive interrupt request output in step 1014 in response to the CPU programming the DMA controller in step 1012. The DMA controller performs the DMA transfer in step 1016. The DMA controller generates an interrupt request on the PIC interrupt request input associated with the drive in step 1018. In response, the CPU clears the DMA controller interrupt request in step 1020. In response, the DMA controller stops generating the interrupt request, couples the drive interrupt request output to the associated PIC interrupt request input, and updates the DMA controller status register in step 1022.

Figure 11:
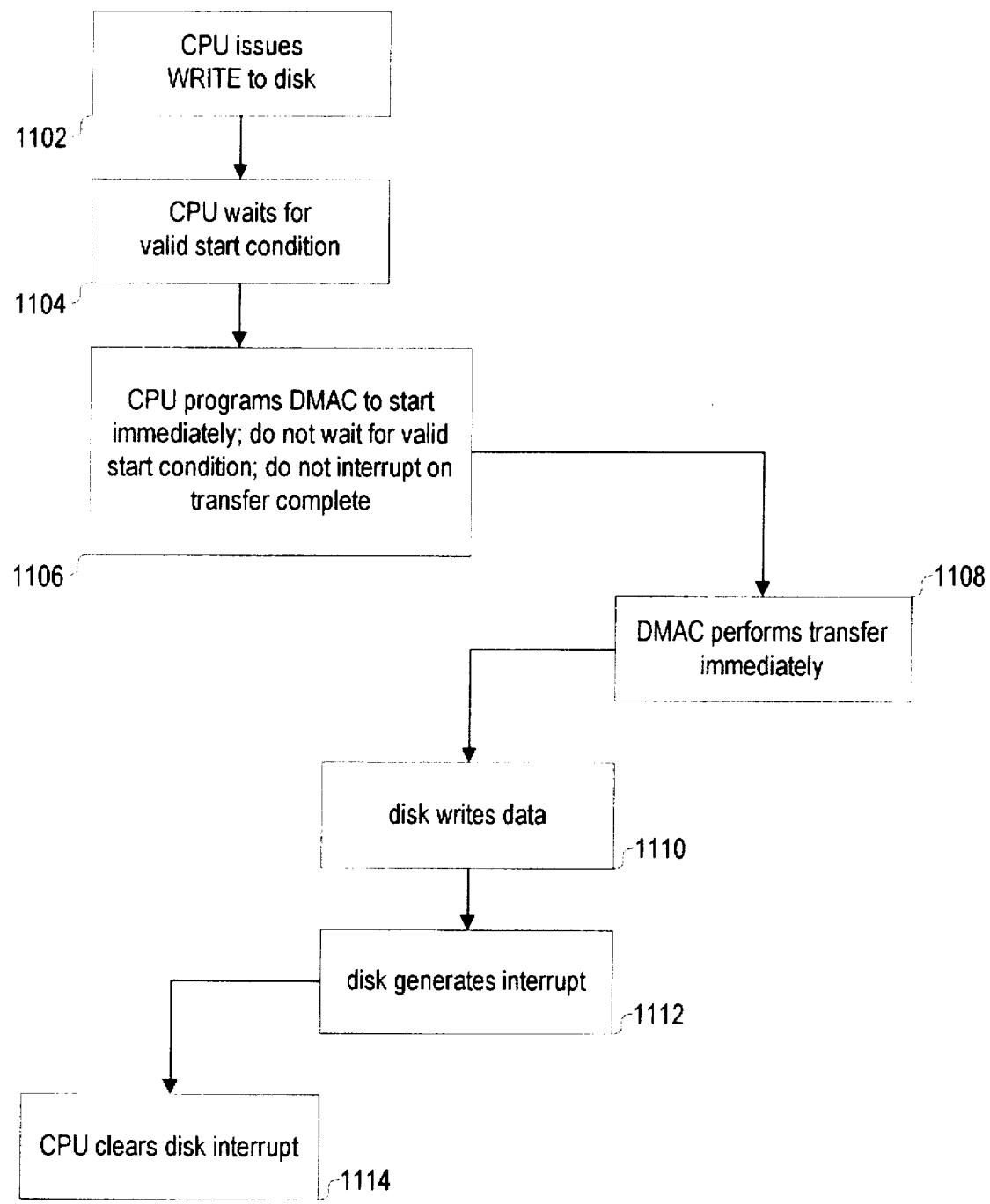
FIG. 11 is a flowchart illustrating steps taken by a device driver in writing a sector to a typical AT disk drive according to one embodiment of the present invention.

Referring to FIG. 11, a flowchart of a method of employing a system according to the preferred embodiment previously described to perform a write of sector(s) to a hard disk drive according one embodiment of the present invention is shown. The CPU issues a WRITE command to the disk drive for specific data in step 1102. The CPU then waits for the drive to indicate that it is ready to receive the data associated with the WRITE command in step 1104. Once the CPU determines that the drive is ready to receive the data the CPU programs the DMA controller to start a DMA transfer immediately of the requested data from system memory to the drive, not to wait for a valid start condition, and not to generate an interrupt upon completion of the DMA transfer in step 1106. The DMA controller performs the DMA transfer in step 1108. In response, the drive stores the received data to its media or a data cache in step 1110. Once the drive has stored the data it generates an interrupt to notify the CPU that the data has been stored in step 1112. In response to the drive interrupt request, the CPU invokes the interrupt service routine associated with the drive interrupt request and in step 1114 clears the drive interrupt request.

Figure 12:
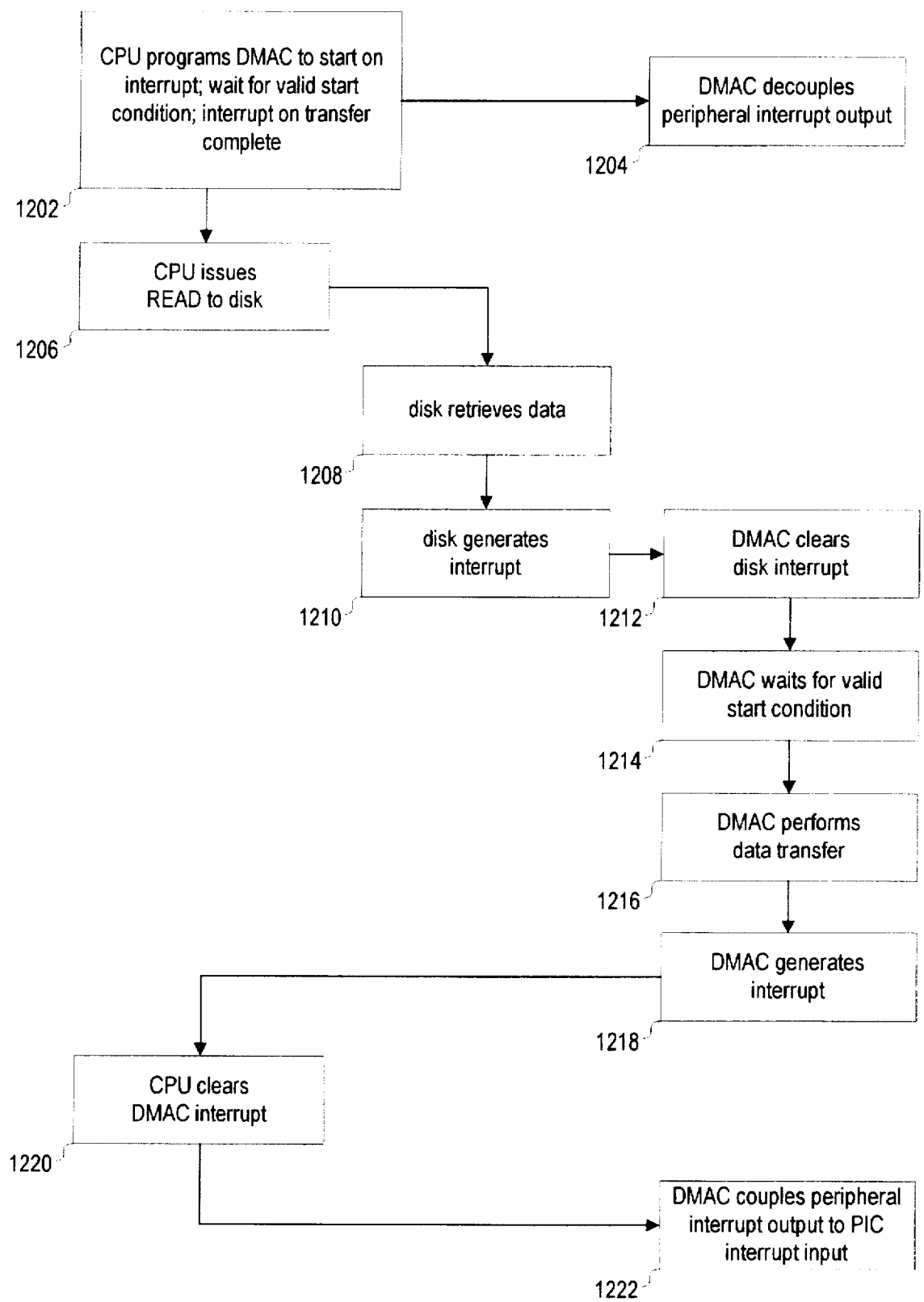
FIG. 12 is a flowchart illustrating steps taken by a device driver in reading a sector from a typical AT disk drive according to a second embodiment of the present invention.

Referring now to FIG. 12, a flowchart of a method of employing a system according to the preferred embodiment previously described to perform a read of sector(s) from a hard disk drive according one embodiment of the present invention is shown. The CPU programs the DMA controller to start a DMA transfer upon receiving an interrupt from the drive of the requested data from the drive to system memory, to wait for a valid start condition, and to generate an interrupt upon completion of the DMA transfer in step 1202. In response, the DMA controller decouples the drive interrupt request output and waits for the drive to generate an interrupt request in step 1204. The CPU issues a READ command to the disk drive for specific data in step 1206. In response, the drive retrieves the requested data from its media or from a data cache in step 1208. When the drive has the requested data available to transfer to system memory the drive interrupts the CPU in step 1210. In response to the drive interrupt request, the DMA controller clears the drive interrupt request in step 1212. The DMA controller then periodically polls a status register of the drive until the DMA controller determines that the drive is ready to transfer the requested data in step 1214. Once the DMA controller determines the requested data is available the DMA controller performs the DMA transfer from the drive to system memory in step 1216. The DMA controller then generates an interrupt request on the PIC interrupt request input associated with the drive in step 1218. In response to the interrupt request, the CPU clears the DMA controller interrupt request in step 1220. In response to the clearing of the interrupt request, the DMA controller stops generating the interrupt, couples the drive interrupt request output to its corresponding PIC interrupt request input, and updates the DMA controller status register accordingly in step 1222.

Figure 13:
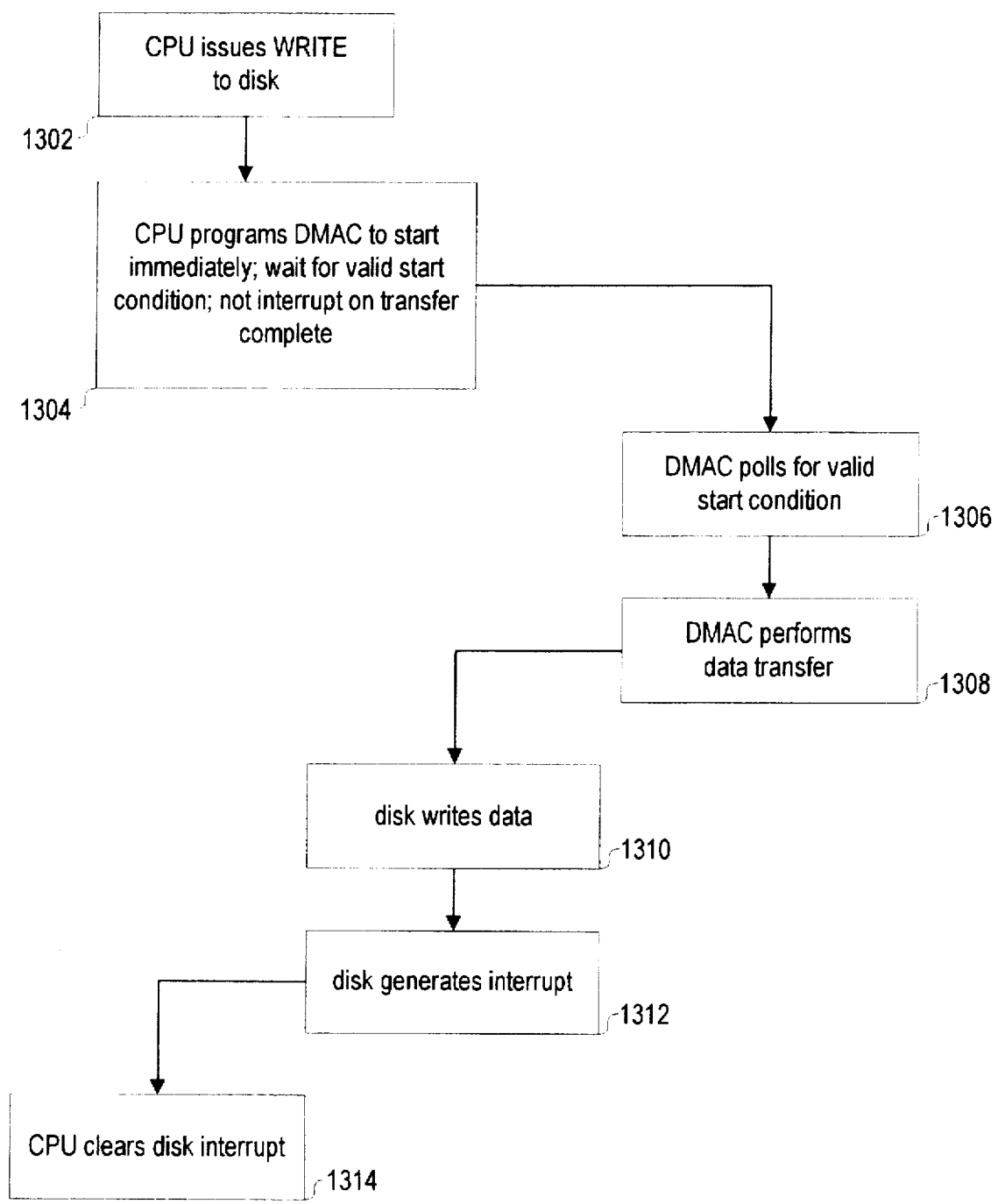
FIG. 13 is a flowchart illustrating steps taken by a device driver in writing a sector to a typical AT disk drive according to a second embodiment of the present invention.
Figure 14:
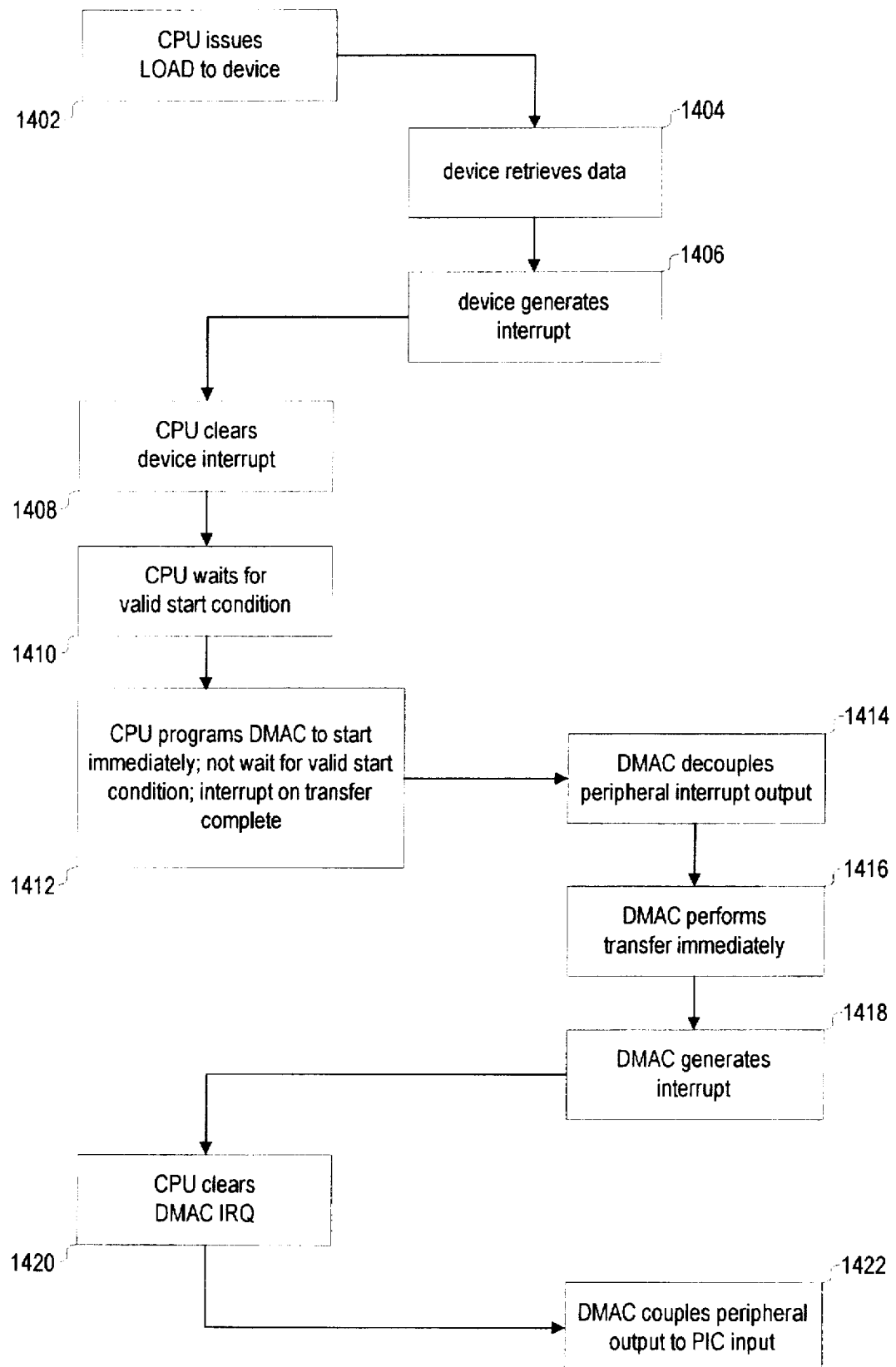
FIG. 14 is a flowchart illustrating steps taken by a device driver in transferring data from a peripheral device to system memory according to one embodiment of the present invention.
Figure 15:
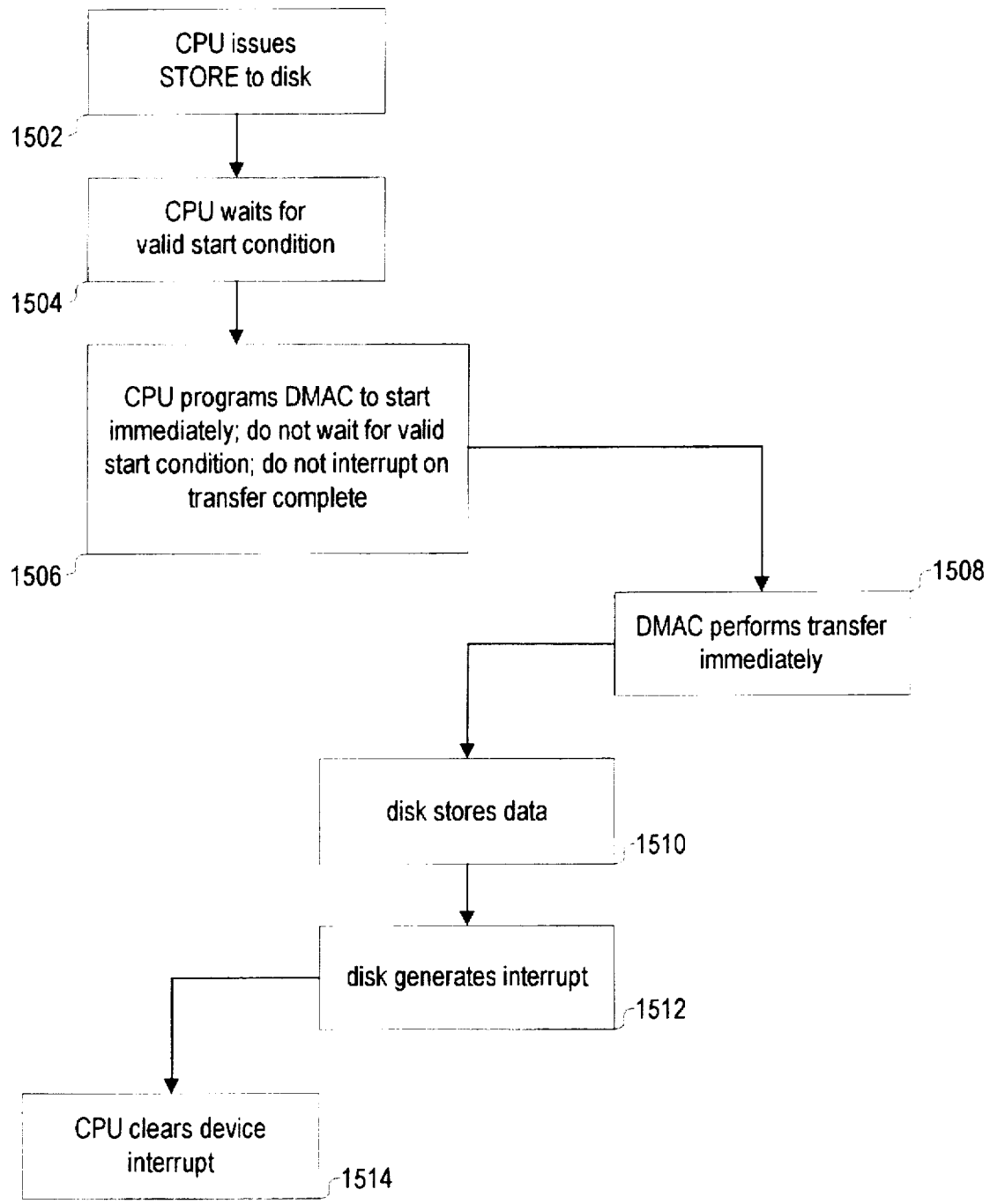
FIG. 15 is a flowchart illustrating steps taken by a device driver in transferring data from system memory to a peripheral device according to one embodiment of the present invention.
Figure 16:
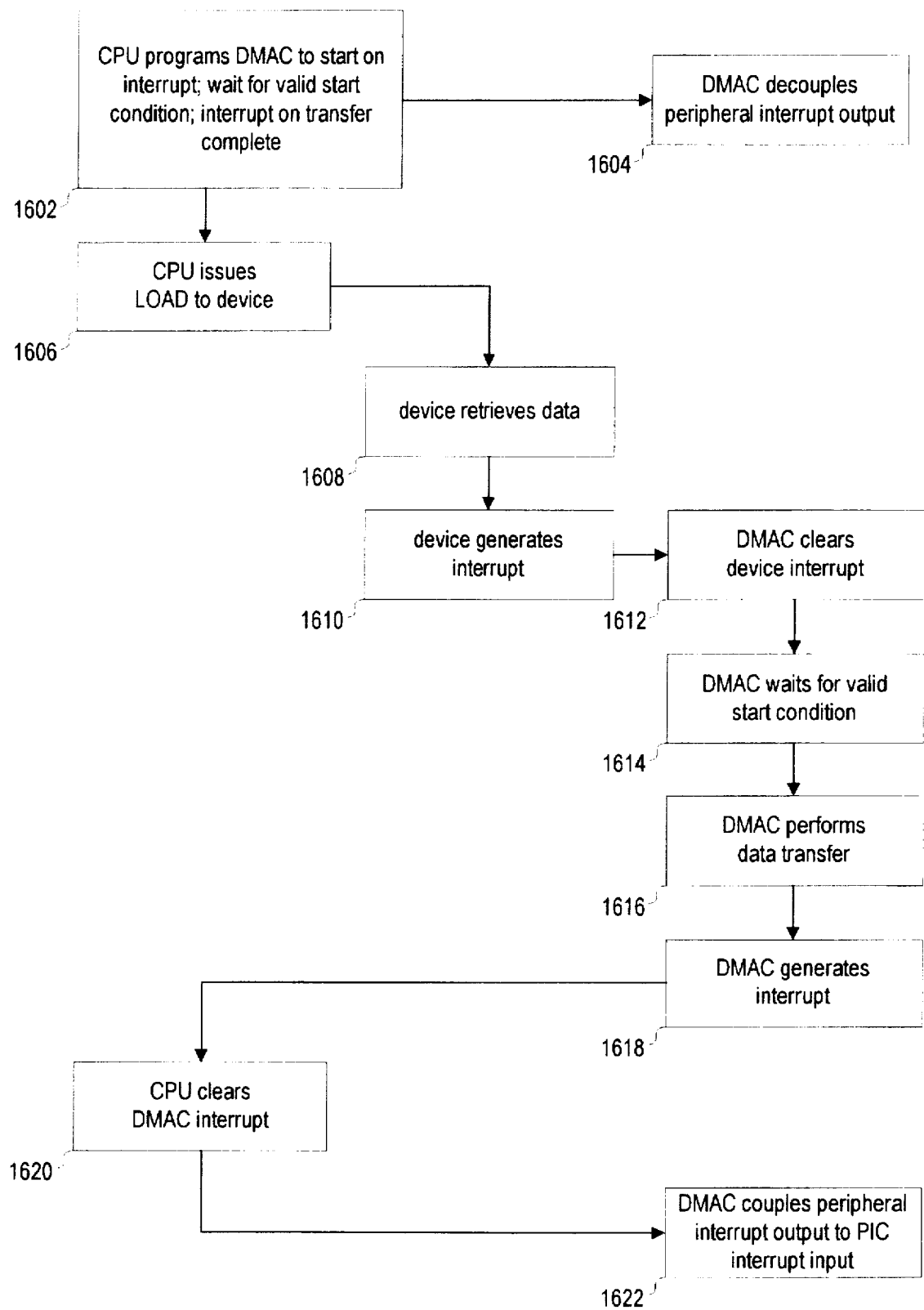
FIG. 16 is a flowchart illustrating steps taken by a device driver in transferring data from a peripheral device to system memory according to a second embodiment of the present invention.
Figure 17:
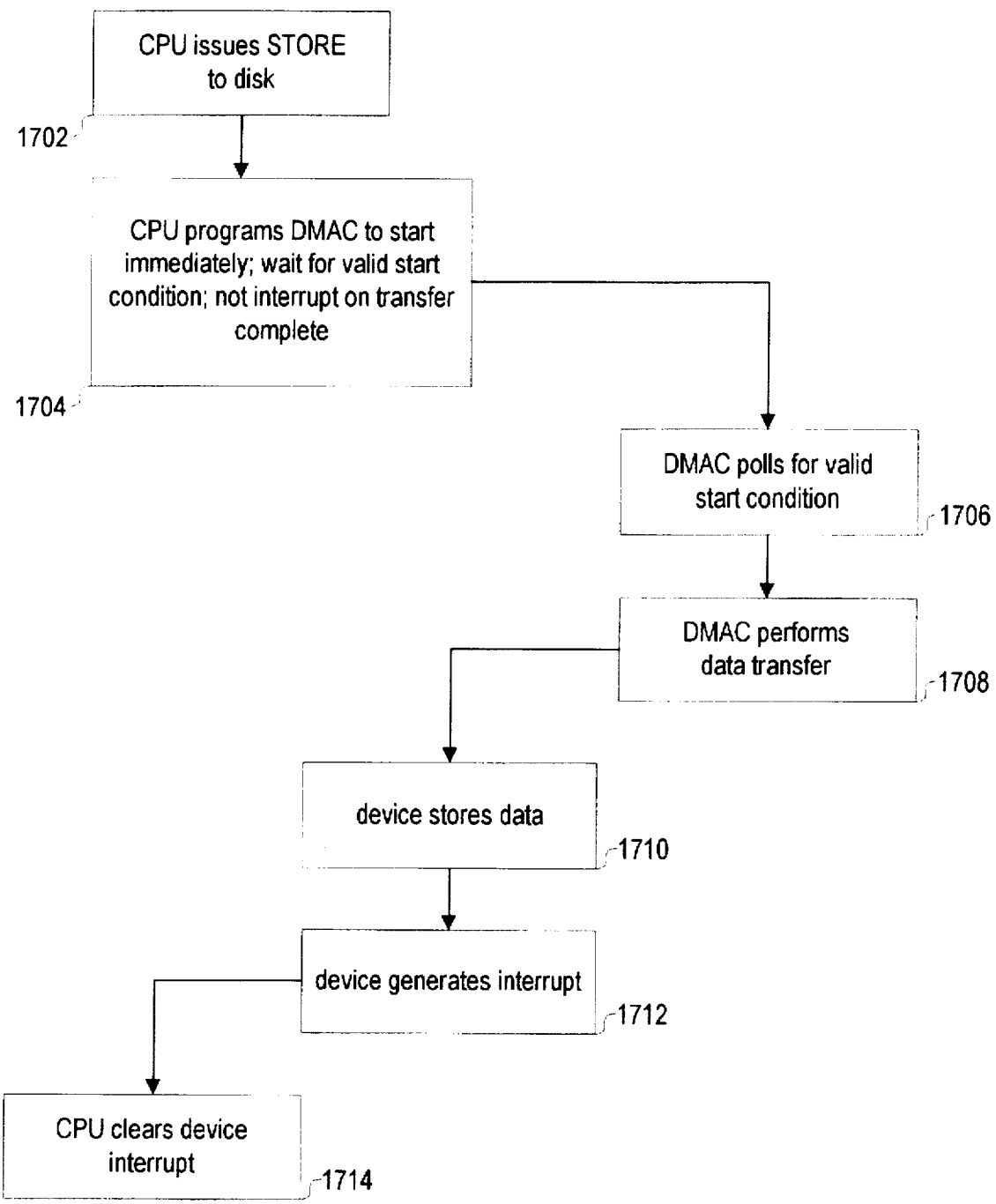
FIG. 17 is a flowchart illustrating steps taken by a device driver in transferring data from system memory to a peripheral device according to a second embodiment of the present invention.

Referring to FIG. 13, a flowchart of a method of employing a system according to the preferred embodiment previously described to perform a write of sector(s) to a hard disk drive according one embodiment of the present invention is shown. The CPU issues a WRITE command to the disk drive for specific data in step 1302. The CPU then programs the DMA controller to start a DMA transfer immediately of the requested data from system memory to the drive, to wait for a valid start condition, and not to generate an interrupt upon completion of the DMA transfer in step 1304. In response, the DMA controller waits for the drive to indicate that it is ready to receive the data associated with the WRITE command in step 1306. Once the DMA controller determines that the drive is ready to receive the data the DMA controller transfers the requested data from system memory to the drive in step 1308. In response, the drive stores the received data to its media or a data cache in step 1310. Once the drive has stored the data it generates an interrupt to notify the CPU that the data has been stored in step 1312. In response to the drive interrupt request, the CPU invokes the interrupt service routine associated with the drive interrupt request and in step 1314 clears the drive interrupt request.

Referring now to FIGS. 14 through 17, flowcharts of methods of employing a system according to the preferred embodiment similar to FIGS. 10 through 13, respectively, are shown. FIGS. 14 through 17 describe methods for performing load and store transfers of data between a peripheral device in general and system memory rather than READ and WRITE transfers of data between a disk drive and system memory.

Numerous variations and modifications will become apparent to those skilled in the art once the above disclosure is fully appreciated. It is intended that the following claims be interpreted to embrace all such variations and modifications.

What is claimed is:

1. A method for performing a transfer of data in a computer system comprising one or more buses, a CPU having a CPU interrupt request input, a peripheral device having a peripheral interrupt request output, a system memory, and a programmable direct memory access (DMA) controller which improves the real-time characteristics of said computer system comprising:

said CPU programming said DMA controller to start said transfer of said data and to generate an interrupt to said CPU upon completion of said transfer of said data;

said DMA controller performing said transfer of said data in response to said CPU programming said DMA controller;

said DMA controller decoupling said peripheral interrupt request output from said CPU interrupt request input in response to said CPU programming said DMA controller;

said DMA controller generating said interrupt to said CPU to indicate said transfer of said data is complete in response to completion of said transfer of said data;

said CPU clearing said interrupt; and said DMA controller coupling said peripheral interrupt request output to said CPU interrupt request input in response to said CPU clearing said interrupt.

2. The method of claim 1 further comprising:

said CPU programming said peripheral device to initiate said transfer of said data from said peripheral device to said system memory before said CPU programming said DMA controller to start said transfer of said data;

said peripheral device retrieving said data in response to said CPU programming said peripheral device;

said peripheral device generating a previous interrupt on said peripheral interrupt request output to indicate said data is available in response to said peripheral device retrieving said data, wherein said previous interrupt occurs prior to said interrupt;

said CPU clearing said previous interrupt, wherein said CPU programming said DMA controller to start said transfer of said data is in response to said CPU clearing said previous interrupt.

3. A method for performing a transfer of data in a computer system comprising one or more buses, a CPU having a CPU interrupt request input, a peripheral device having a peripheral interrupt request output, a system memory, and a programmable direct memory access (DMA) controller, which improves the real-time characteristics of said computer system comprising:

said CPU programming said peripheral device to initiate said transfer of said data from said system memory to said peripheral device;

said CPU programming said DMA controller to start said transfer of said data after said CPU programming said peripheral device;

said DMA controller performing said transfer of said data from said system memory to said peripheral device in response to said CPU programming said DMA controller;

said peripheral device storing said data after said DMA controller performing said transfer of said data;

said peripheral device generating an interrupt on said peripheral interrupt request output to indicate said data has been stored in response to said peripheral storing said data; and said CPU clearing said interrupt generated by said peripheral device in response to said peripheral device generating an interrupt, wherein said DMAC does not generate an interrupt upon completion of said transfer of said data.

4. A method for performing a transfer of data in a computer system comprising one or more buses, a CPU having a CPU interrupt request input, a peripheral device having a peripheral interrupt request output, a system memory, and a programmable direct memory access (DMA) controller, which improves the real-time characteristics of said computer system comprising:

said CPU programming said DMA controller to start said transfer of said data upon said peripheral device generating a first interrupt and upon determining that a valid start condition exists and to generate a second interrupt to said CPU upon completion of said transfer of said data;

said DMA controller decoupling said peripheral interrupt request output from said CPU interrupt request input in response to said CPU programming said DMA controller;

said CPU programming said peripheral device to initiate said transfer of said data from said peripheral device to said system memory after said CPU programming said DMA controller;

said peripheral device retrieving said data in response to said CPU programming said peripheral device;

said peripheral device generating said first interrupt on said peripheral interrupt request output to indicate said data is available in response to said peripheral device retrieving said data;

said DMA controller clearing said first interrupt;

said DMA controller waiting for said valid start condition to exist after said DMA controller clearing said first interrupt;

said DMA controller performing said transfer of said data after waiting for said valid start condition to exist;

said DMA controller generating said second interrupt to said CPU to indicate said transfer of said data is complete after said DMA controller decoupling;

said CPU clearing said second interrupt; and said DMA controller coupling said peripheral interrupt request output to said CPU interrupt request input in response to said CPU clearing said second interrupt.

5. A method for performing a transfer of data in a computer system comprising one or more buses, a CPU having a CPU interrupt request input, a peripheral device having a peripheral interrupt request output, a system memory, and a programmable direct memory access (DMA) controller, which improves the real-time characteristics of said computer system comprising:

said CPU programming said peripheral device to initiate said transfer of said data from said system memory to said peripheral device;

said CPU programming said DMA controller to start said transfer of said data upon determining that a valid start condition exists after said CPU programming said peripheral device;

said DMA controller waiting for said valid start condition to exist in response to said CPU programming said DMA controller;

said DMA controller performing said transfer of said data after waiting for said valid start condition to exist;

said peripheral device storing said data after said DMA controller performing said transfer of said data;

said peripheral device generating an interrupt on said peripheral interrupt request output to indicate said data has been stored in response to said peripheral storing said data; and said CPU clearing said interrupt.

\* \* \* \* \*